(12) United States Patent
Yamamoto et al.

(10) Patent No.: US 10,698,828 B2
(45) Date of Patent: Jun. 30, 2020

(54) COPYING FRAGMENTED FILES BETWEEN SEQUENTIAL STORAGE MEDIUMS

(71) Applicant: International Business Machines Corporation, Armonk, NY (US)

(72) Inventors: Noriko Yamamoto, Tokyo (JP); Tsuyoshi Miyamura, Yokohama (JP); Tohru Hasegawa, Tokyo (JP); Hiroshi Itagaki, Yokohama (JP); Shinsuke Mitsuma, Higashimurayama (JP); Sosuke Matsui, Machida (JP)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 15/950,085

(22) Filed: Apr. 10, 2018

(65) Prior Publication Data

US 2019/0310942 A1  Oct. 10, 2019

(51) Int. Cl.
*G06F 3/00* (2006.01)
*G06F 12/0868* (2016.01)
*G06F 3/06* (2006.01)
*G11B 5/008* (2006.01)

(52) U.S. Cl.
CPC .......... *G06F 12/0868* (2013.01); *G06F 3/068* (2013.01); *G06F 3/0611* (2013.01); *G06F 3/0647* (2013.01); *G11B 5/00817* (2013.01); *G06F 2212/1024* (2013.01); *G06F 2212/213* (2013.01)

(58) Field of Classification Search
None
See application file for complete search history.

(56) References Cited

U.S. PATENT DOCUMENTS

| 9,600,493 | B1 | 3/2017 | Hasegawa et al. |
| 2015/0095294 | A1 | 4/2015 | Tsuda |
| 2015/0347022 | A1 | 12/2015 | Ashida et al. |
| 2017/0153820 | A1 | 6/2017 | Hasegawa et al. |

OTHER PUBLICATIONS

IBM, "IBM System Storage Tape Drive 3592," SCSI Reference, Dec. 16, 2014, pp. 1-544.
SNIA, "Linear Tape File System (LTFS) Format Specification," SNIA Technical Position, Version 22.0, Dec. 21, 2013, pp. 1-69.
Itagaki, H., "IBM Linear Tape File System Library Edition V2R1," IBM Corporation, Service Transfer Education, 2011, pp. 1-63.

*Primary Examiner* — Midys Rojas
(74) *Attorney, Agent, or Firm* — Zilka-Kotab, P.C.

(57) ABSTRACT

A computer-implemented method, according to one embodiment, includes: sending one or more instructions to calculate a combined size of fragments included in the fragmented files, sending one or more instructions to designate a portion of cache which corresponds to at least the combined size of the fragments, sending one or more instructions to send a copy of each non-fragmented file from a first drive directly to a second drive in which the second sequential storage medium is loaded, sending one or more instructions to use the designated portion of the cache to accumulate the fragments included in the fragmented files, and sending one or more instructions to send a copy of each of the fragments corresponding to a given fragmented file from the cache to the second drive in response to determining that all of the fragments corresponding to the given fragmented file have been accumulated in the cache.

25 Claims, 21 Drawing Sheets

COPYING FRAGMENTED FILES BETWEEN SEQUENTIAL STORAGE MEDIUMS

BACKGROUND

The present invention relates to data storage systems, and more particularly, this invention relates to copying fragmented files between sequential storage mediums.

As the name suggests, data is stored on a sequential storage medium in a sequential fashion. Accordingly, as data is written to a sequential storage medium, it is appended to the end of whatever data has already been written on the medium. As data stored on a sequential storage medium is updated over time, the updates are also appended to the end of whatever data has already been written on the sequential storage medium, as opposed to actually replacing (overwriting) the previous and now obsolete version of the data. As a result, files stored on the sequential storage medium become fragmented as portions of the files are updated over time. Thus, despite originally having been written sequentially and in series, the data corresponding to a given file may be spread across the sequential storage medium over time.

While read and/or write operations may still be successfully performed on a sequential storage medium on which file data has experienced fragmentation, the process of copying fragmented data between sequential storage mediums faces significant setbacks. Data may be copied between sequential storage mediums for a number of different reasons, e.g., such as upgrading the quality of the sequential storage medium and/or reclaiming a particular sequential storage medium.

However, conventional products have been unable to efficiently perform such copying of fragmented data between sequential storage mediums. Specifically, conventional products read each portion of each file individually before copying the corresponding file from one sequential storage medium to another. Thus, the amount of time associated with copying data from one sequential storage medium to another is significantly lengthened as the number of fragmented files on the source sequential storage medium increases.

In an effort to avoid these latency spikes when copying data from one sequential storage medium to another, attempts have been made by conventional products to use a cache as a staging area for the data on a sequential storage medium before it is written to a second sequential storage medium. Although these attempts reduced latency, they also significantly increased operating costs, as cache is significantly more expensive per unit of data than sequential storage media. As the storage capacity of sequential storage media continues to increase, these conventional attempts require a cache which has a large enough capacity to store all of the data on a corresponding sequential storage medium. For example, the storage capacity of magnetic tape is currently upwards of 15 TB. Thus, these attempts ultimately result in decreased efficiency and even degraded performance of the cache.

In sharp contrast to these shortcomings experienced by conventional products, various approaches described herein are able to reduce latency while copying data between sequential storage mediums, while also minimizing data consumption.

SUMMARY

A computer-implemented method, according to one embodiment, is for copying fragmented files and non-fragmented files from a first sequential storage medium to a second sequential storage medium. The method includes: sending one or more instructions to calculate a combined size of fragments included in the fragmented files, sending one or more instructions to designate a portion of cache which corresponds to at least the combined size of the fragments, sending one or more instructions to send a copy of each non-fragmented file from a first drive directly to a second drive in which the second sequential storage medium is loaded, sending one or more instructions to use the designated portion of the cache to accumulate the fragments included in the fragmented files, and sending one or more instructions to send a copy of each of the fragments corresponding to a given fragmented file from the cache to the second drive in response to a determination that all of the fragments corresponding to the given fragmented file have been accumulated in the cache. The computer-implemented method further includes: receiving an indication that each of the fragments corresponding to the given fragmented file have been stored on the second sequential storage medium; and sending one or more instructions to delete the fragments corresponding to the given fragmented file from the designated portion of the cache.

Directly copying data corresponding to non-fragmented files from one tape drive to another without moving the data through the cache and/or a host system is desirable as the load on the cache and/or host system is reduced. This allows for the cache and/or host system to maintain efficient performance, reduce resource (e.g., processing, memory, power, etc.) consumption, increase data transfer speeds, etc., while also ensuring that data stored on the second magnetic tape is done so in a non-fragmented manner. Thus, the characteristics of the data stored on the second magnetic tape as well as the efficiency by which operations may be performed using the second magnetic tape may be improved as a result.

The computer-implemented method also includes: determining whether a difference between a size of the designated portion of the cache and a combined size of the accumulated fragments is in a predefined range, and sending one or more instructions to the first drive in which the first sequential storage medium is loaded to stop reading the first sequential storage medium in response to determining that the difference between the size of the designated portion of the cache and the combined size of the accumulated fragments is in the range. By halting the first tape drive from reading the first magnetic tape, data is allowed to be transferred from the cache to the second magnetic tape without the cache receiving any additional data from the first magnetic tape. Thus, although cache may not be receiving data from the first tape drive, the cache is preferably still defragmenting files and sending a copy of each of the fragments corresponding to the defragmented file to the second tape drive. As a result, the cache may be gradually emptied to a desired level whereby normal operation may be resumed. This avoids undesirable situations in which the designated portion of the cache is overfilled and threatens the data security of the remainder of the cache.

Furthermore, calculating the combined size of the fragments included in the fragmented files may include: examining entries in a linear tape file system (LTFS) index, and determining whether each entry in the LTFS index corresponds to a first fragment of a fragmented file. Each of the entries in the LTFS index corresponds to a fragment on the first sequential storage medium, and each of the entries denotes a start position and a size of the corresponding fragment. In response to determining that an entry in the LTFS index corresponds to a first fragment of a given fragmented file, a full size of the given fragmented file is added to the combined size. However, in other approaches the size of the given fragment is added to the combined size. As a result, an accurate representation of the combined size of the fragments included in all of the fragmented files on the first magnetic tape is calculated. Achieving an accurate representation is highly desirable, as storage space in cache is valuable. Thus, memory consumption is reduced in addition to improving the efficiency at which the cache operates by not overestimating how much cache may be used.

A computer program product, according to another embodiment, is for copying fragmented files and non-fragmented files from a first sequential storage medium to a second sequential storage medium. The computer program product includes a computer readable storage medium having program instructions embodied therewith. The computer readable storage medium is not a transitory signal per se. Moreover, the program instructions readable and/or executable by a processor to cause the processor to perform a method which includes: calculating, by the processor, a combined size of fragments included in the fragmented files; sending, by the processor, one or more instructions to designate a portion of cache which corresponds to at least the combined size of the fragments; sending, by the processor, a copy of each non-fragmented file directly to a second drive in which the second sequential storage medium is loaded; sending, by the processor, one or more instructions to use the designated portion of the cache to accumulate the fragments included in the fragmented files; and sending, by the processor, one or more instructions to send a copy of each of the fragments corresponding to a given fragmented file from the cache to the second drive in response to a determination that all of the fragments corresponding to the given fragmented file have been accumulated in the cache. The program instructions are also readable and/or executable by the processor to cause the processor to perform the method which includes: receiving, by the processor, an indication that each of the fragments corresponding to the given fragmented file have been stored on the second sequential storage medium; and sending, by the processor, one or more instructions to delete the fragments corresponding to the given fragmented file from the designated portion of the cache.

As mentioned above, directly copying data corresponding to non-fragmented files from one tape drive to another without moving the data through the cache and/or a host system is desirable as the load on the cache and/or host system is reduced. This allows for the cache and/or host system to maintain efficient performance, reduce resource (e.g., processing, memory, power, etc.) consumption, increase data transfer speeds, etc., while also ensuring that data stored on the second magnetic tape is done so in a non-fragmented manner. Thus, the characteristics of the data stored on the second magnetic tape as well as the efficiency by which operations may be performed using the second magnetic tape may be improved as a result.

The program instructions are also readable and/or executable by the processor to cause the processor to perform the method which includes: determining, by the processor, whether a difference between a size of the designated portion of the cache and a combined size of the accumulated fragments is in a predefined range; and instructing, by the processor, a first drive in which the first sequential storage medium is loaded to stop reading the first sequential storage medium in response to determining that the difference between the size of the designated portion of the cache and the combined size of the accumulated fragments is in the range. By halting the first tape drive from reading the first magnetic tape, data is allowed to be transferred from the cache to the second magnetic tape without the cache receiving any additional data from the first magnetic tape. Thus, although cache may not be receiving data from the first tape drive, the cache is preferably still defragmenting files and sending a copy of each of the fragments corresponding to the defragmented file to the second tape drive. As a result, the cache may be gradually emptied to a desired level whereby normal operation may be resumed. This avoids undesirable situations in which the designated portion of the cache is overfilled and threatens the data security of the remainder of the cache.

Furthermore, calculating the combined size of the fragments included in the fragmented files may include: examining entries in a LTFS index, and determining whether each entry in the LTFS index corresponds to a first fragment of a fragmented file. Each of the entries corresponds to a fragment on the first sequential storage medium, and each of the entries denotes a start position and a size of the corresponding fragment. In response to determining that an entry in the LTFS index corresponds to a first fragment of a given fragmented file, a full size of the given fragmented file is added to the combined size. However, in other approaches, the size of the given fragment is added to the combined size. As a result, an accurate representation of the combined size of the fragments included in all of the fragmented files on the first magnetic tape is calculated. Achieving an accurate representation is highly desirable, as storage space in cache is valuable. Thus, memory consumption is reduced in addition to improving the efficiency at which the cache operates by not overestimating how much cache may be used.

A computer program product, according to yet another embodiment, is for copying fragmented files and non-fragmented files from a first sequential storage medium to a second sequential storage medium. The computer program product comprising a computer readable storage medium having program instructions embodied therewith. The computer readable storage medium is not a transitory signal per se. Moreover, the program instructions readable and/or executable by a processor to cause the processor to perform a method which includes: sending, by the processor, one or more instructions to calculate a combined size of fragments included in the fragmented files; designating, by the processor, a portion of cache which corresponds to at least the combined size of the fragments; sending, by the processor, one or more instructions to send a copy of each non-fragmented file from a first drive directly to a second drive in which the second sequential storage medium is loaded; using, by the processor, the designated portion of the cache to accumulate the fragments included in the fragmented files; and sending, by the processor, a copy of each of the fragments corresponding to a given fragmented file from the cache to the second drive in response to a determination that all of the fragments corresponding to the given fragmented file have been accumulated in the cache. The program instructions are readable and/or executable by the processor to cause the processor to perform the method which further includes: receiving, by the processor, an indication that each of the fragments corresponding to the given fragmented file have been stored on the second sequential storage medium; and deleting, by the processor, the fragments corresponding to the given fragmented file from the designated portion of the cache.

Directly copying data corresponding to non-fragmented files from one tape drive to another without moving the data through the cache and/or a host system is desirable as the load on the cache and/or host system is reduced. This allows for the cache and/or host system to maintain efficient performance, reduce resource (e.g., processing, memory, power, etc.) consumption, increase data transfer speeds, etc., while also ensuring that data stored on the second magnetic tape is done so in a non-fragmented manner. Thus, the characteristics of the data stored on the second magnetic tape as well as the efficiency by which operations may be performed using the second magnetic tape may be improved as a result.

The program instructions also readable and/or executable by the processor to cause the processor to perform the method which includes: determining, by the processor, whether a difference between a size of the designated portion of the cache and a combined size of the accumulated fragments is in a predefined range; and sending, by the processor, one or more instructions to the first drive in which the first sequential storage medium is loaded to stop reading the first sequential storage medium in response to determining that the difference between the size of the designated portion of the cache and the combined size of the accumulated fragments is in the range. By halting the first tape drive from reading the first magnetic tape, data is allowed to be transferred from the cache to the second magnetic tape without the cache receiving any additional data from the first magnetic tape. Thus, although cache may not be receiving data from the first tape drive, the cache is preferably still defragmenting files and sending a copy of each of the fragments corresponding to the defragmented file to the second tape drive. As a result, the cache may be gradually emptied to a desired level whereby normal operation may be resumed. This avoids undesirable situations in which the designated portion of the cache is overfilled and threatens the data security of the remainder of the cache.

Moreover, calculating the combined size of the fragments included in the fragmented files includes: examining entries in a LTFS index, and determining whether each entry in the LTFS index corresponds to a first fragment of a fragmented file. Each of the entries in the LTFS index corresponds to a fragment on the first sequential storage medium, abd each of the entries denotes a start position and a size of the corresponding fragment. In response to determining that an entry in the LTFS index corresponds to a first fragment of a given fragmented file, adding a full size of the given fragmented file to the combined size. However, in other approaches the size of the given fragment is added to the combined size. As a result, an accurate representation of the combined size of the fragments included in all of the fragmented files on the first magnetic tape is calculated. Achieving an accurate representation is highly desirable, as storage space in cache is valuable. Thus, memory consumption is reduced in addition to improving the efficiency at which the cache operates by not overestimating how much cache may be used.

A system, according to still another embodiment, includes: a first tape drive, and a processor. The first tape drive further includes: a magnetic head; a drive mechanism for passing a sequential storage medium over the magnetic head; and a take-up reel. Moreover, logic is integrated with the processor, executable by the processor, or integrated with and executable by the processor, the logic being configured to: calculate, by the processor, a combined size of fragments included in fragmented files; send, by the processor, one or more instructions to designate a portion of cache which corresponds to at least the combined size of the fragments; send, by the processor, a copy of each non-fragmented file directly to a second drive in which a second sequential storage medium is loaded; send, by the processor, one or more instructions to use the designated portion of the cache to accumulate the fragments included in the fragmented files; and send, by the processor, one or more instructions to send a copy of each of the fragments corresponding to a given fragmented file from the cache to the second drive in response to a determination that all of the fragments corresponding to the given fragmented file have been accumulated in the cache.

Again, directly copying data corresponding to non-fragmented files from one tape drive to another without moving the data through the cache and/or a host system is desirable as the load on the cache and/or host system is reduced. This allows for the cache and/or host system to maintain efficient performance, reduce resource (e.g., processing, memory, power, etc.) consumption, increase data transfer speeds, etc., while also ensuring that data stored on the second magnetic tape is done so in a non-fragmented manner. Thus, the characteristics of the data stored on the second magnetic tape as well as the efficiency by which operations may be performed using the second magnetic tape may be improved as a result.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1A:
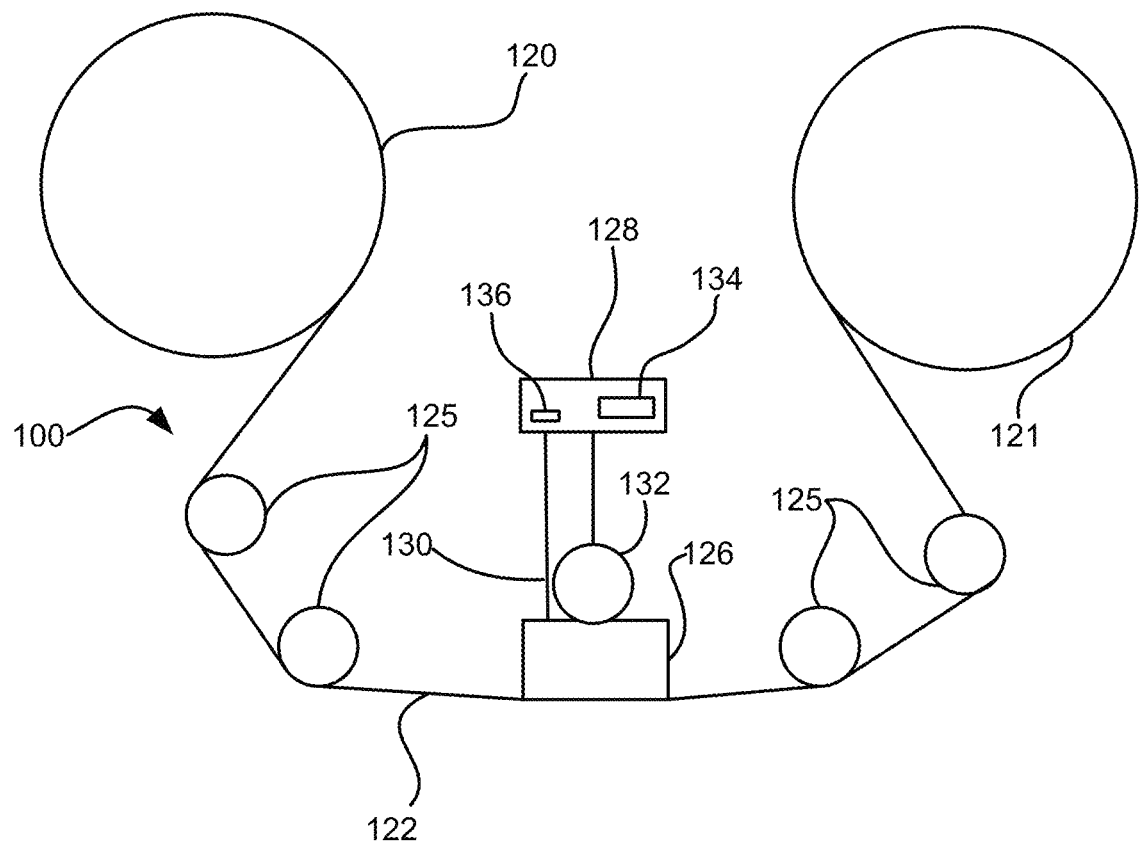
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems which include sequential storage media, as well as operation and/or component parts thereof. More specifically, various ones of the approaches included herein describe processes which may be used to efficiently transfer data between sequential storage mediums, even when at least some of the data is stored on the source sequential storage medium in a fragmented manner. Moreover, it should be noted that although the various approaches included herein may be implemented with any desired type of sequential storage media, e.g., such as magnetic tape, optical disks, etc., they have been described in the context of magnetic tape for added clarity. Accordingly, the fact that a number of the approaches included herein are described in a magnetic tape context, this is in no way intended to limit the invention, but rather is presented by way of example as would be appreciated by one skilled in the art after reading the present description.

In one general embodiment, a computer-implemented method is for copying fragmented files and non-fragmented files from a first sequential storage medium to a second sequential storage medium. The method includes: sending one or more instructions to calculate a combined size of fragments included in the fragmented files, sending one or more instructions to designate a portion of cache which corresponds to at least the combined size of the fragments, sending one or more instructions to send a copy of each non-fragmented file from a first drive directly to a second drive in which the second sequential storage medium is loaded, sending one or more instructions to use the designated portion of the cache to accumulate the fragments included in the fragmented files, and sending one or more instructions to send a copy of each of the fragments corresponding to a given fragmented file from the cache to the second drive in response to a determination that all of the fragments corresponding to the given fragmented file have been accumulated in the cache.

In another general embodiment, a computer program product is for copying fragmented files and non-fragmented files from a first sequential storage medium to a second sequential storage medium. The computer program product includes a computer readable storage medium having program instructions embodied therewith. The computer readable storage medium is not a transitory signal per se. Moreover, the program instructions readable and/or executable by a processor to cause the processor to perform a method which includes: calculating, by the processor, a combined size of fragments included in the fragmented files; sending, by the processor, one or more instructions to designate a portion of cache which corresponds to at least the combined size of the fragments; sending, by the processor, a copy of each non-fragmented file directly to a second drive in which the second sequential storage medium is loaded; sending, by the processor, one or more instructions to use the designated portion of the cache to accumulate the fragments included in the fragmented files; and sending, by the processor, one or more instructions to send a copy of each of the fragments corresponding to a given fragmented file from the cache to the second drive in response to a determination that all of the fragments corresponding to the given fragmented file have been accumulated in the cache.

In yet another general embodiment, a computer program product is for copying fragmented files and non-fragmented files from a first sequential storage medium to a second sequential storage medium. The computer program product comprising a computer readable storage medium having program instructions embodied therewith. The computer readable storage medium is not a transitory signal per se. Moreover, the program instructions readable and/or executable by a processor to cause the processor to perform a method which includes: sending, by the processor, one or more instructions to calculate a combined size of fragments included in the fragmented files; designating, by the processor, a portion of cache which corresponds to at least the combined size of the fragments; sending, by the processor, one or more instructions to send a copy of each non-fragmented file from a first drive directly to a second drive in which the second sequential storage medium is loaded; using, by the processor, the designated portion of the cache to accumulate the fragments included in the fragmented files; and sending, by the processor, a copy of each of the fragments corresponding to a given fragmented file from the cache to the second drive in response to a determination that all of the fragments corresponding to the given fragmented file have been accumulated in the cache.

In another general embodiment, a system includes: a first tape drive, and a processor. The first tape drive further includes: a magnetic head; a drive mechanism for passing a sequential storage medium over the magnetic head; and a take-up reel. Moreover, logic is integrated with the processor, executable by the processor, or integrated with and executable by the processor, the logic being configured to: calculate, by the processor, a combined size of fragments included in fragmented files; send, by the processor, one or more instructions to designate a portion of cache which corresponds to at least the combined size of the fragments; send, by the processor, a copy of each non-fragmented file directly to a second drive in which a second sequential storage medium is loaded; send, by the processor, one or more instructions to use the designated portion of the cache to accumulate the fragments included in the fragmented files; and send, by the processor, one or more instructions to send a copy of each of the fragments corresponding to a given fragmented file from the cache to the second drive in response to a determination that all of the fragments corresponding to the given fragmented file have been accumulated in the cache.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various approaches. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
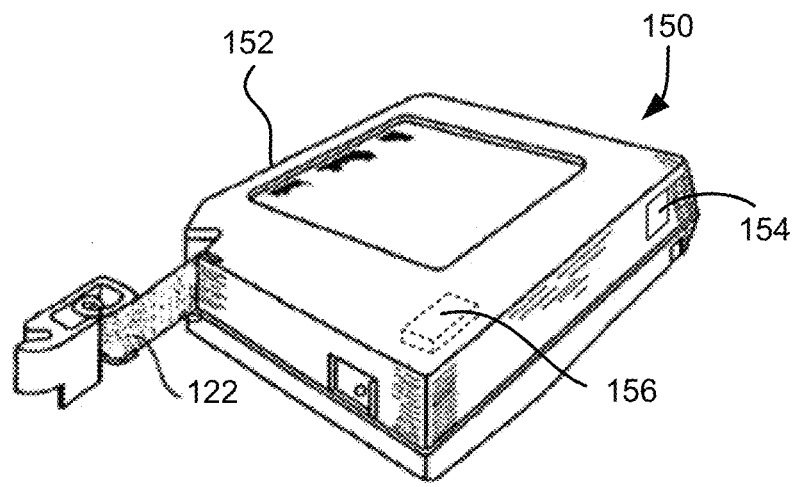
FIG. 1B is a schematic diagram of a tape cartridge according to one embodiment.

FIG. 1B illustrates an exemplary tape cartridge 150 according to one approach. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred approach, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
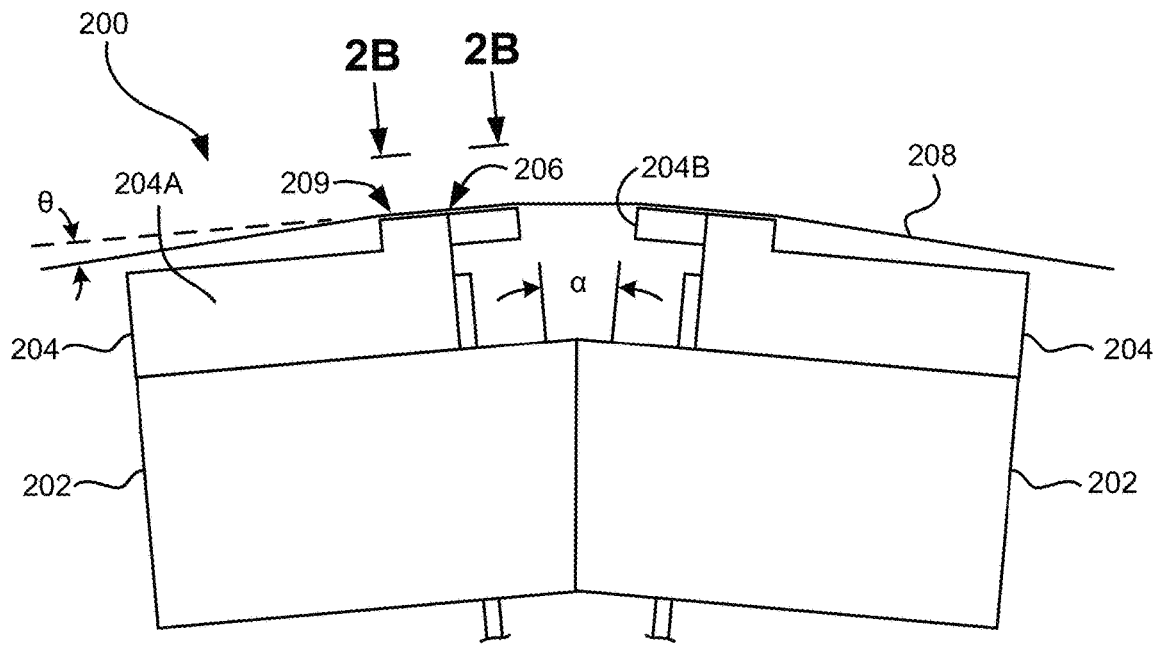
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. During use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
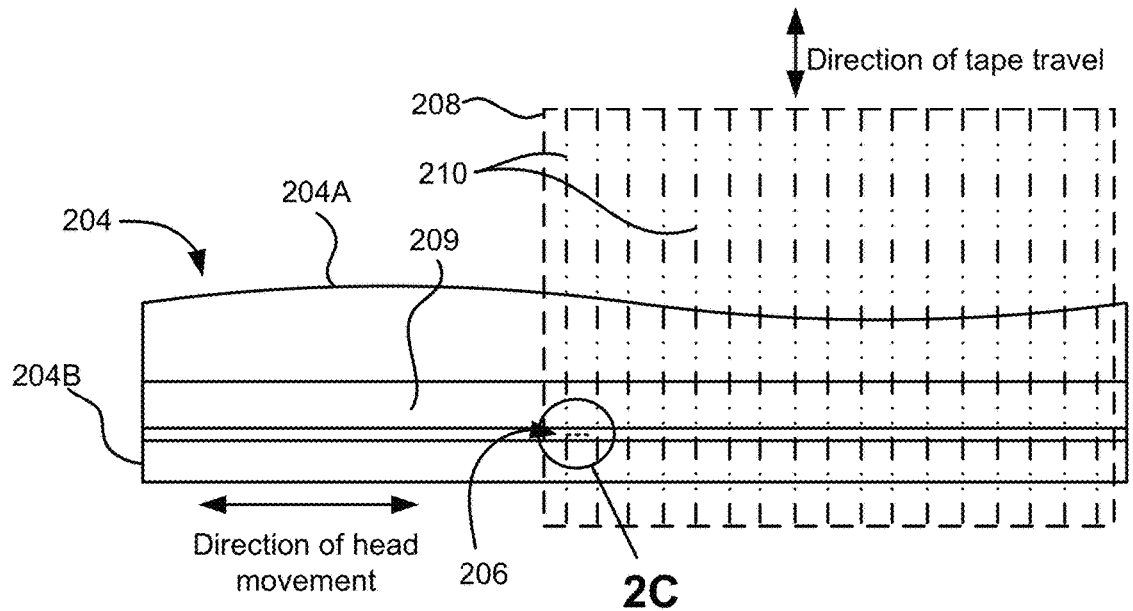
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
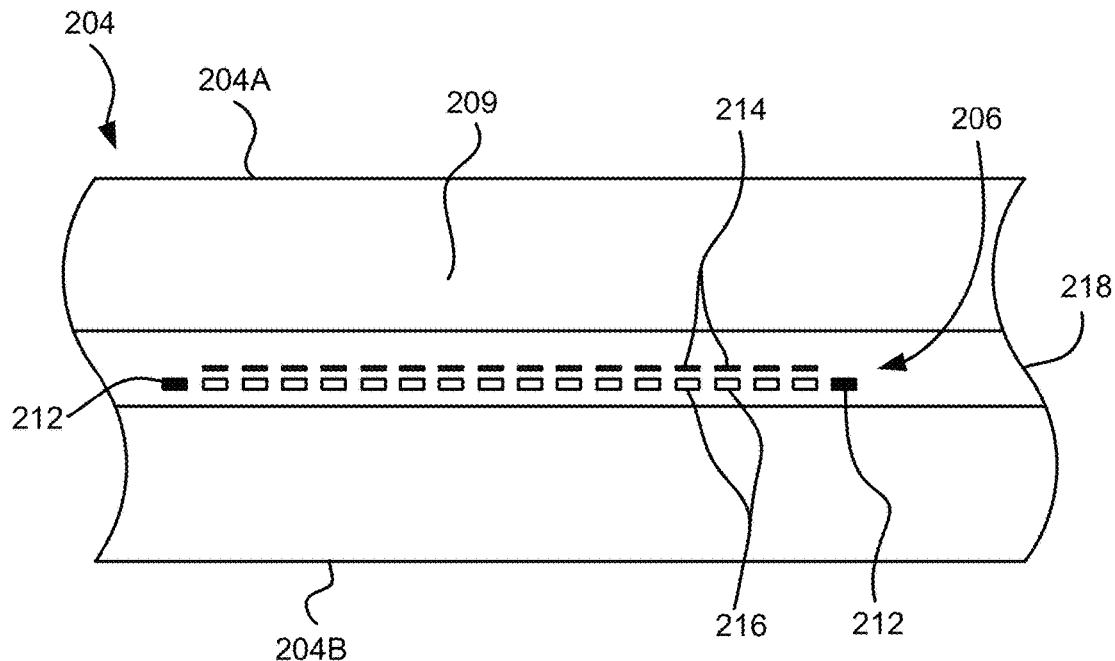
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative approaches include 8, 16, 32, 40, and 64 active readers and/or writers 206 per array, and alternatively interleaved designs having odd numbers of reader or writers such as 17, 25, 33, etc. An illustrative approach includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
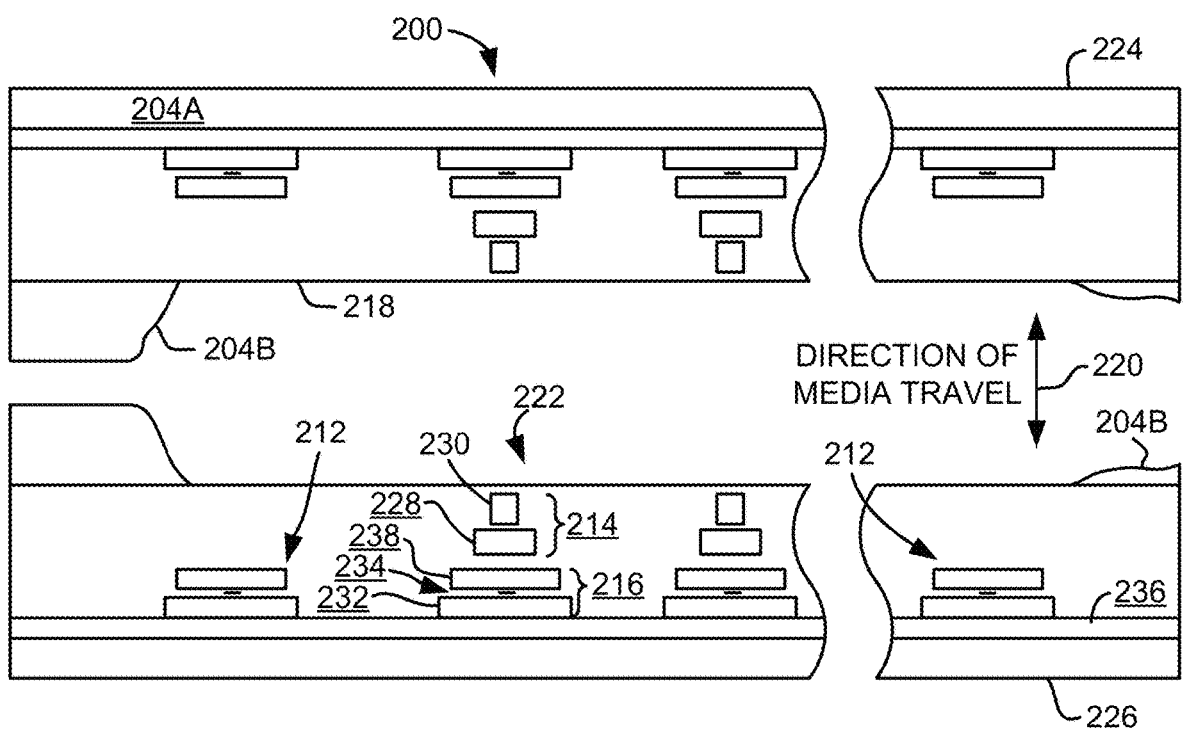
FIG. 2D is a detailed view of a partial tape bearing surface of a pair of modules.

FIG. 2D shows a partial tape bearing surface view of complementary modules of a magnetic tape head 200 according to one approach. In this approach, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked magnetoresistive (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
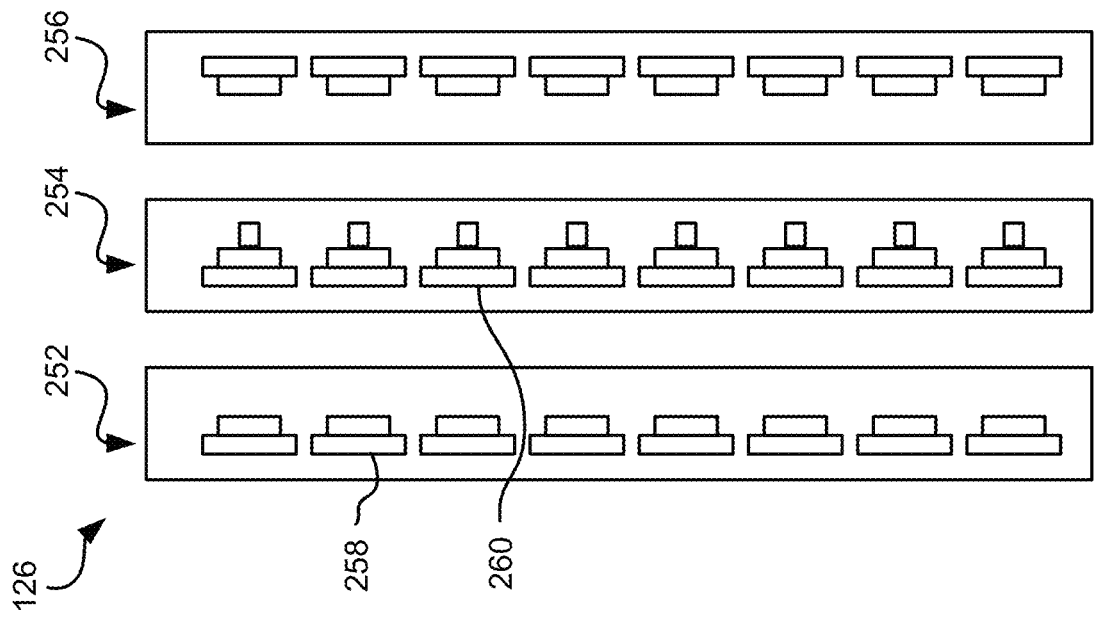
FIG. 4 is a partial tape bearing surface view of a magnetic head having a read-write-read configuration.
Figure 3:
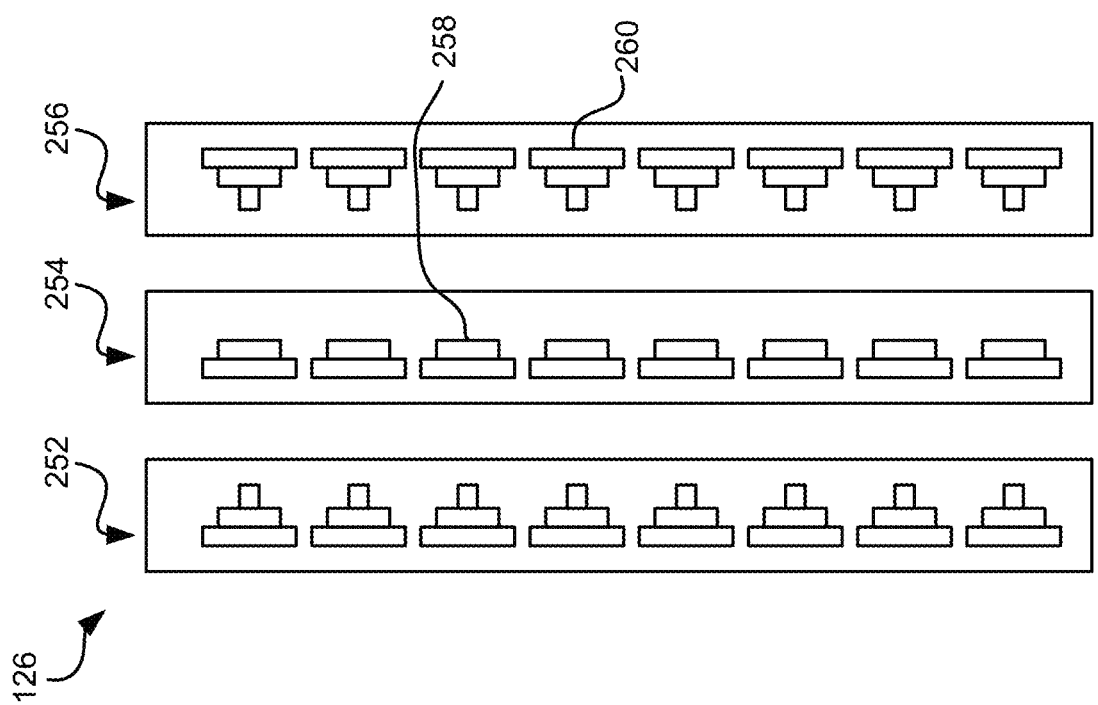
FIG. 3 is a partial tape bearing surface view of a magnetic head having a write-read-write configuration.

The configuration of the tape head 126, according to one approach, includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify approaches of the present invention. One skilled in the art apprised with the teachings herein will appreciate how permutations of the present invention would apply to configurations other than a W-R-W configuration.

Figure 5:
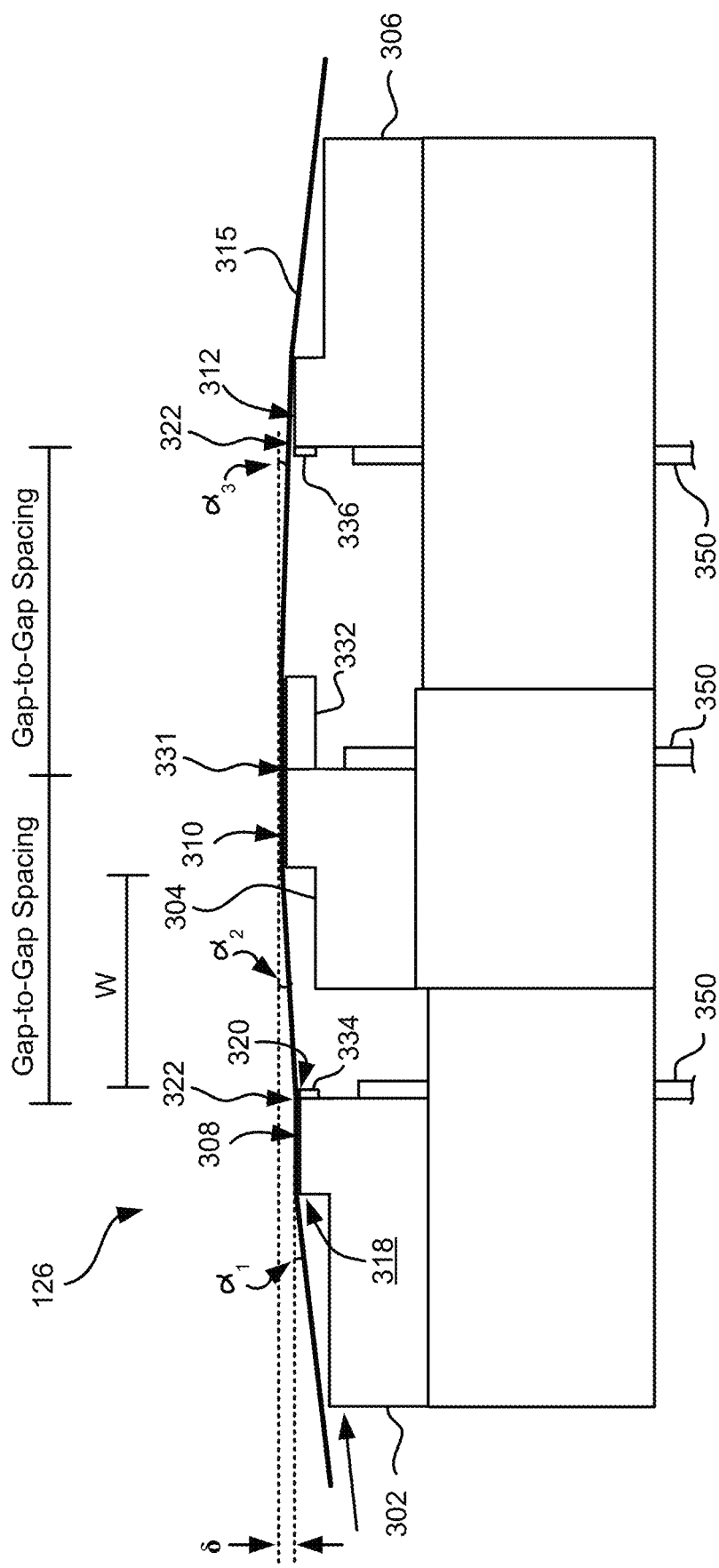
FIG. 5 is a side view of a magnetic tape head with three modules according to one embodiment where the modules all generally lie along about parallel planes.

FIG. 5 illustrates a magnetic head 126 according to one approach which includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
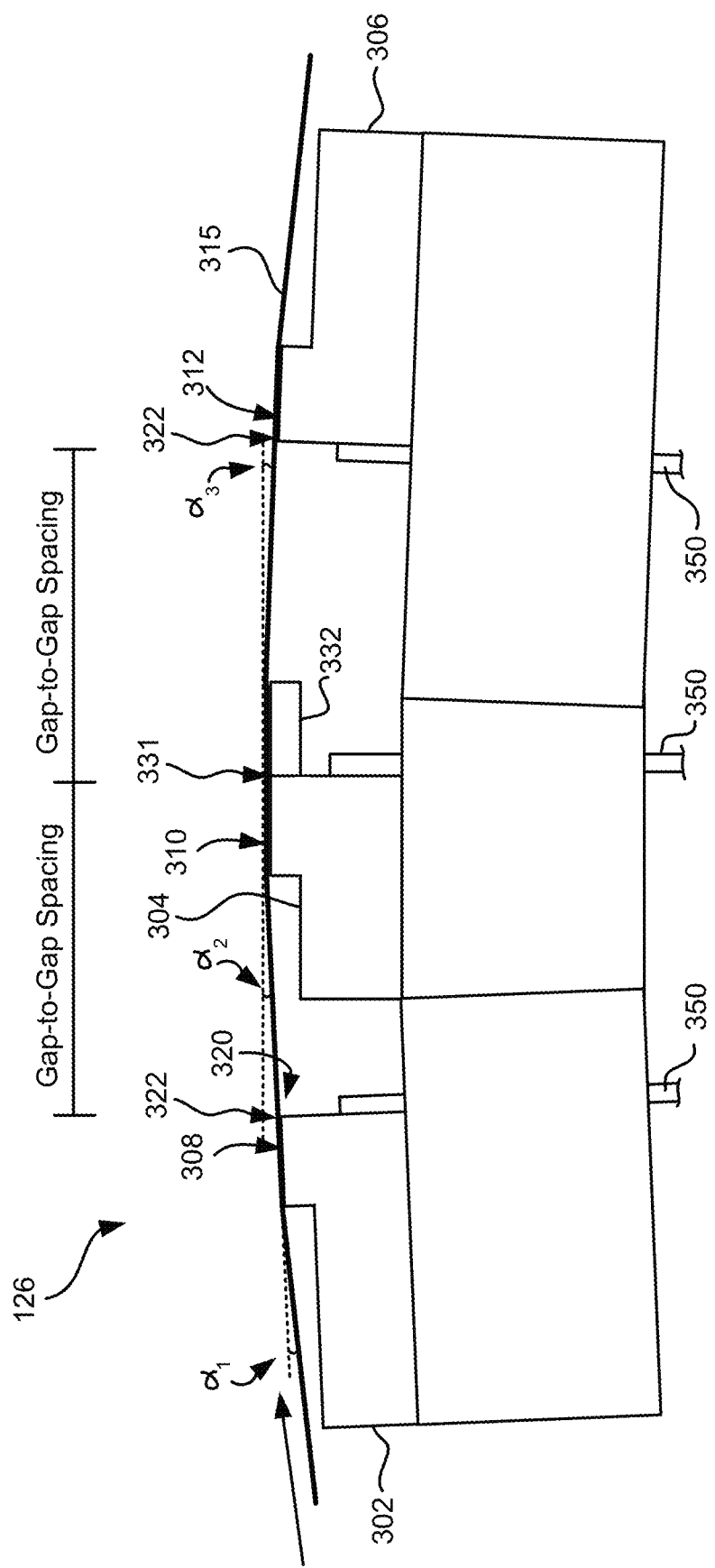
FIG. 6 is a side view of a magnetic tape head with three modules in a tangent (angled) configuration.

In one approach, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha 2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha 2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These approaches are particularly adapted for write-read-write applications.

A benefit of this and other approaches described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1} (\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one approach, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some approaches, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some approaches is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this approach, thereby reducing wear on the elements in the trailing module 306. These approaches are particularly useful for write-read-write applications. Additional aspects of these approaches are similar to those given above.

Typically, the tape wrap angles may be set about midway between the embodiments shown in FIGS. 5 and 6.

Figure 7:
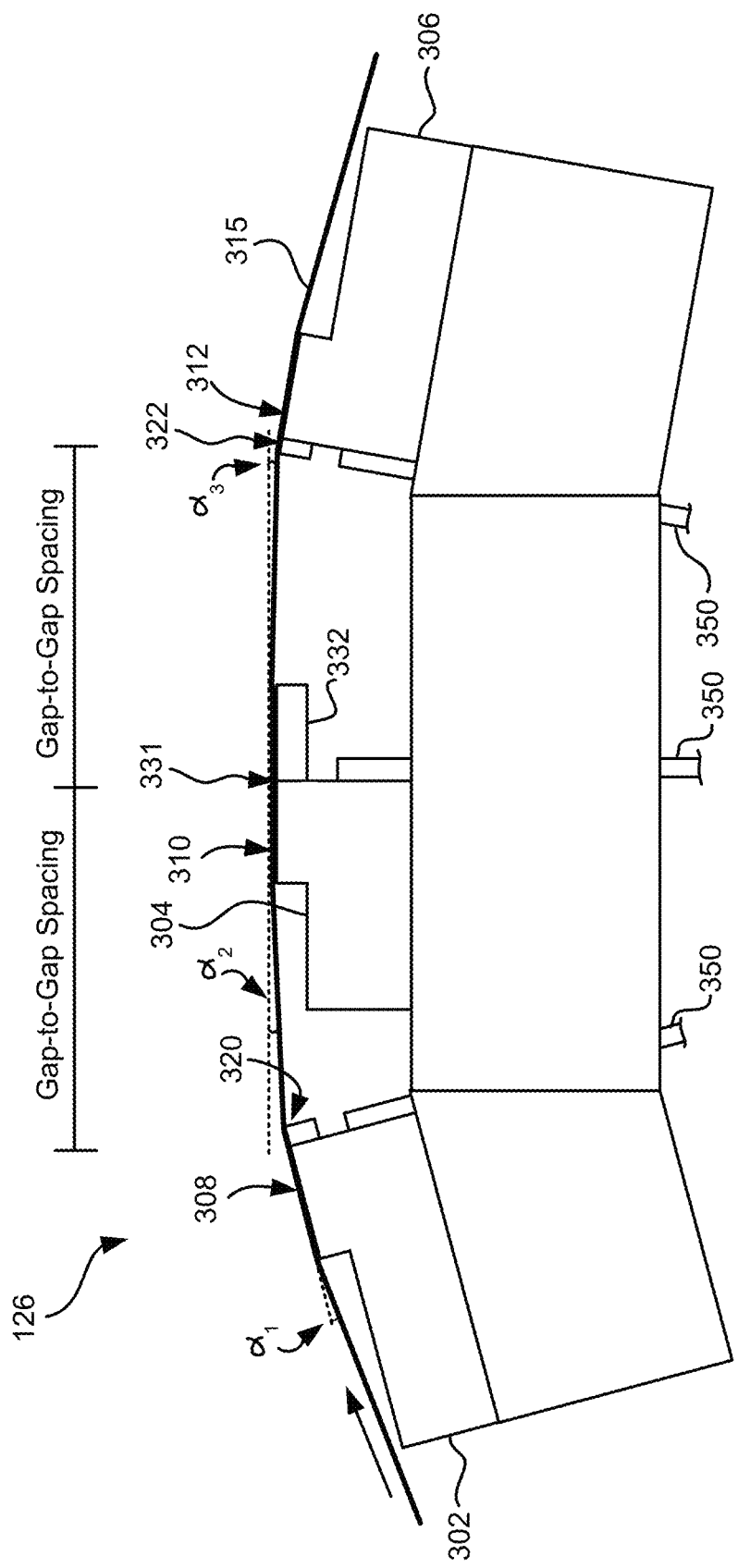
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these approaches are preferred for write-read-write, read-write-read, and write-write-read applications. In the latter approaches, closures should be wider than the tape canopies for ensuring read capability. The wider closures may require a wider gap-to-gap separation. Therefore, a preferred approach includes a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the approaches described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various approaches in conformance with the teachings herein, as would become apparent to one skilled in the art upon reading the present disclosure.

Figure 8A:
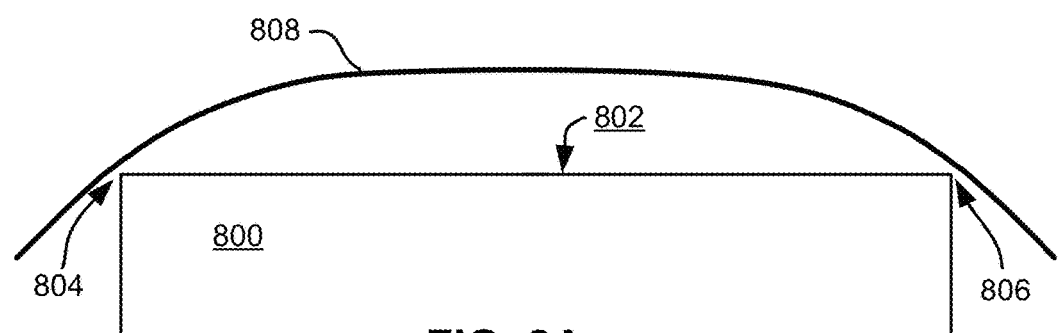
FIGS. 8A-8C are schematics depicting the principles of tape tenting.
Figure 8B:
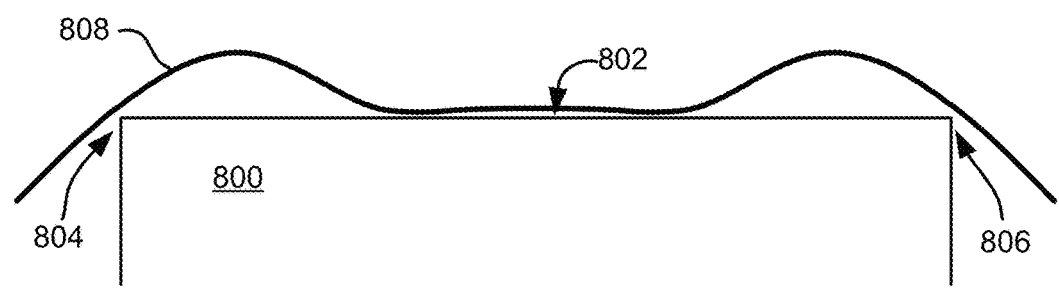
Figure 8C:
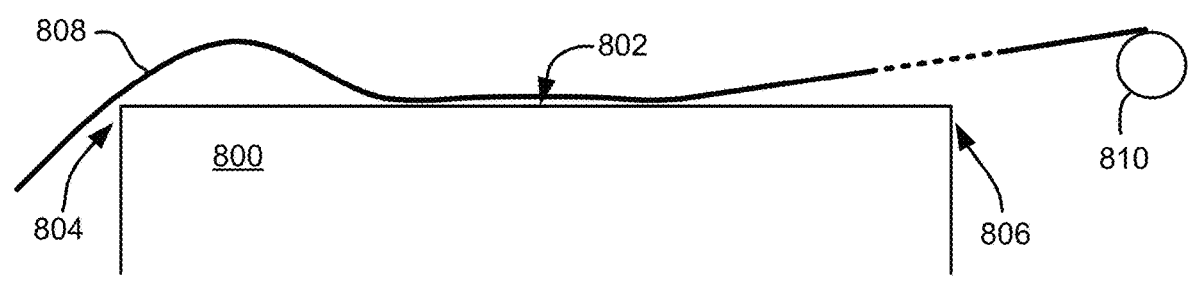

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. LTFS is an exemplary format of a file system that may be implemented in a given library in order to enables access to compliant tapes. It should be appreciated that various approaches herein can be implemented with a wide range of file system formats, including for example IBM Spectrum Archive Library Edition (LTFS LE). However, to provide a context, and solely to assist the reader, some of the approaches below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
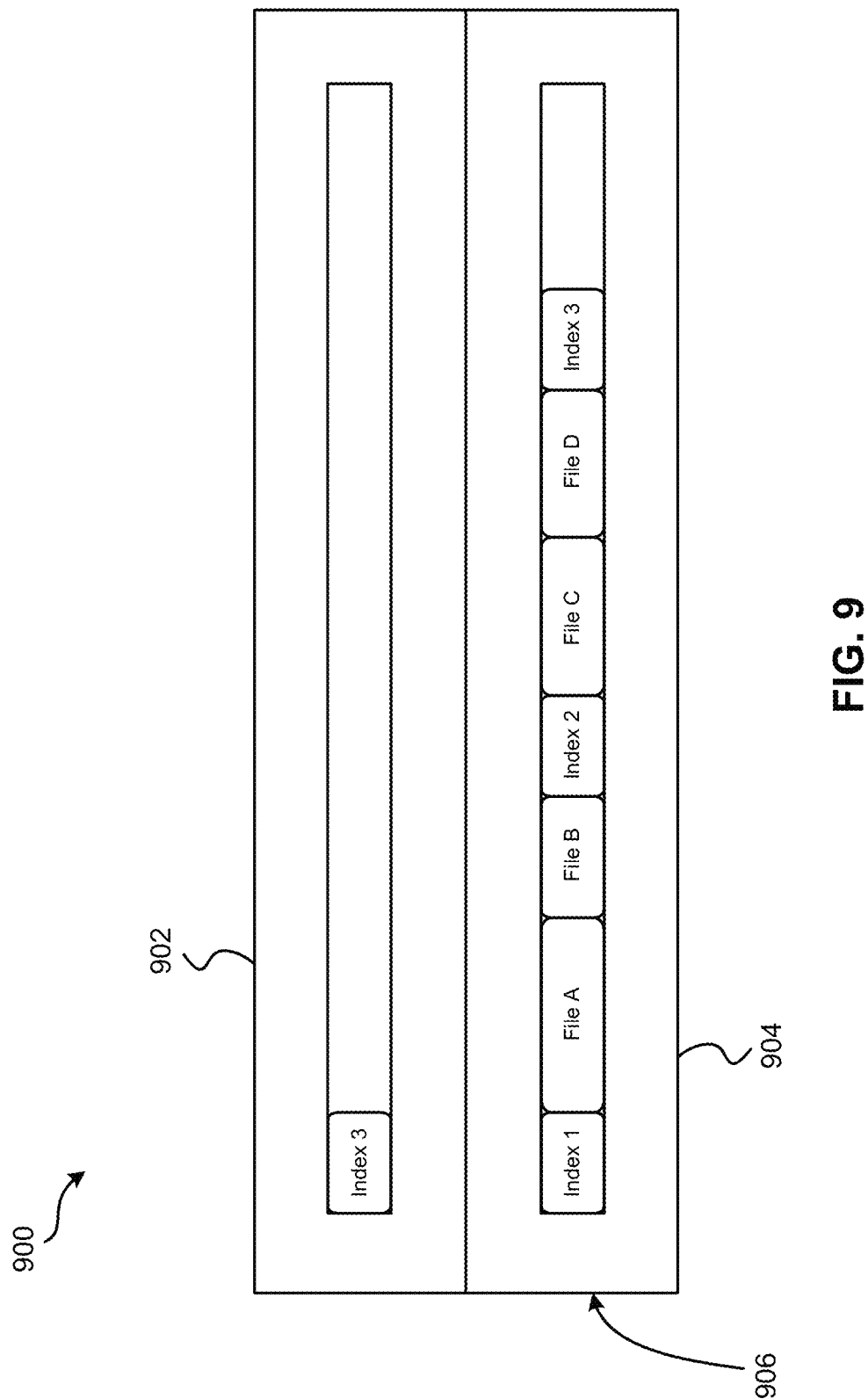
FIG. 9 is a representational diagram of files and indexes stored on a magnetic tape according to one embodiment.

Looking to FIG. 9, a magnetic tape 900 having an index partition 902 and a data partition 904 is illustrated according to one approach. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three versions of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 differently depending on the desired approach. According to some approaches, the metadata of the index partition 902 may be updated in response to the tape being unmounted, e.g., such that the index may be read from the index partition when that tape is mounted again. The metadata may also be written in the data partition 902 so the tape may be mounted using the metadata recorded in the data partition 902, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

Figure 10:
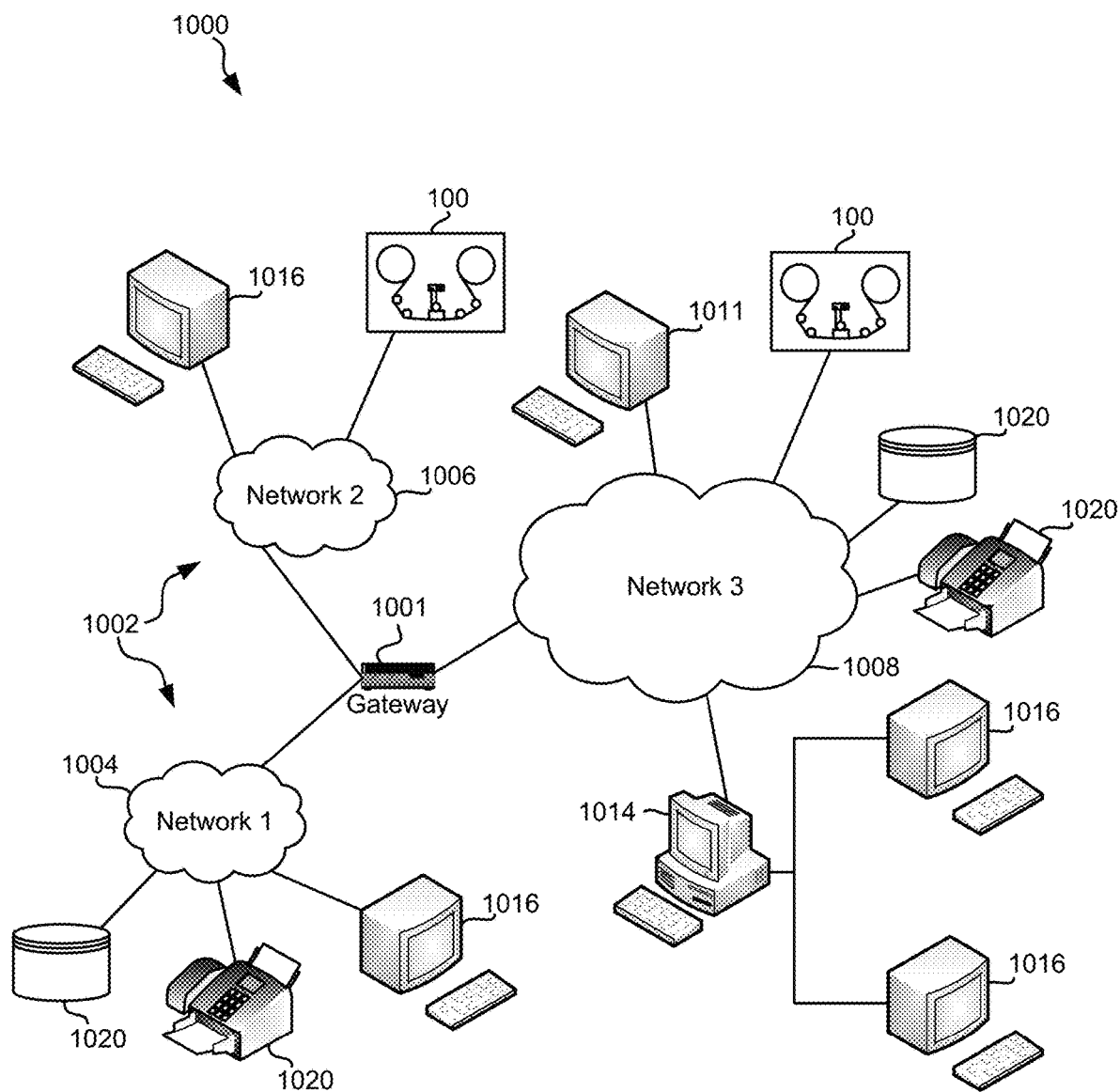
FIG. 10 is a representational view of a network architecture, in accordance with one embodiment.

Various ones of the magnetic tape based components included in the different approaches described above may be used in combination with other components to form a larger combined storage system. Moreover, the architecture of the storage system may vary depending on the number and type of components included in the combined storage system. For instance, looking now to FIG. 10, the architecture of a storage system 1000, is illustrated in accordance with one embodiment. As shown in FIG. 10, a plurality of remote networks 1002 are provided including a first remote network 1004 and a second remote network 1006. A gateway 1001 may be coupled between the remote networks 1002 and a proximate network 1008. In the context of the present architecture of the storage system 1000, the networks 1004, 1006 may each take any form including, but not limited to a local area network (LAN), a wide area network (WAN) such as the Internet, public switched telephone network (PSTN), internal telephone network, etc.

During use, the gateway 1001 serves as an entrance point from the remote networks 1002 to the proximate network 1008. As such, the gateway 1001 may function as a router, which is capable of directing a given packet of data that arrives at the gateway 1001, and a switch, which furnishes the actual path in and out of the gateway 1001 for a given packet.

Further included is at least one data server 1014 coupled to the proximate network 1008, and which is accessible from the remote networks 1002 via the gateway 1001. It should be noted that the data server(s) 1014 may include any type of computing device/groupware. Coupled to each data server 1014 is a plurality of user devices 1016. User devices 1016 may also be connected directly through one of the networks 1004, 1006, 1008. Such user devices 1016 may include a desktop computer, lap-top computer, hand-held computer, printer or any other type of logic. It should be noted that a user device 1011 may also be directly coupled to any of the networks, in one approach.

A peripheral 1020 or series of peripherals 1020, e.g., facsimile machines, printers, networked and/or local storage units or systems, etc., may be coupled to one or more of the networks 1004, 1006, 1008. It should be noted that databases and/or additional components may be utilized with, or integrated into, any type of network element coupled to the networks 1004, 1006, 1008. For example, a tape drive 100 (e.g., see FIG. 1A) is shown as being coupled to each of networks 1006, 1008, e.g., such that data may be written to and/or read from magnetic tape as a result of receiving instructions through either of the of the networks 1006, 1008. Moreover, it should be noted that in the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some approaches.

In more approaches, one or more networks 1004, 1006, 1008, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 11:
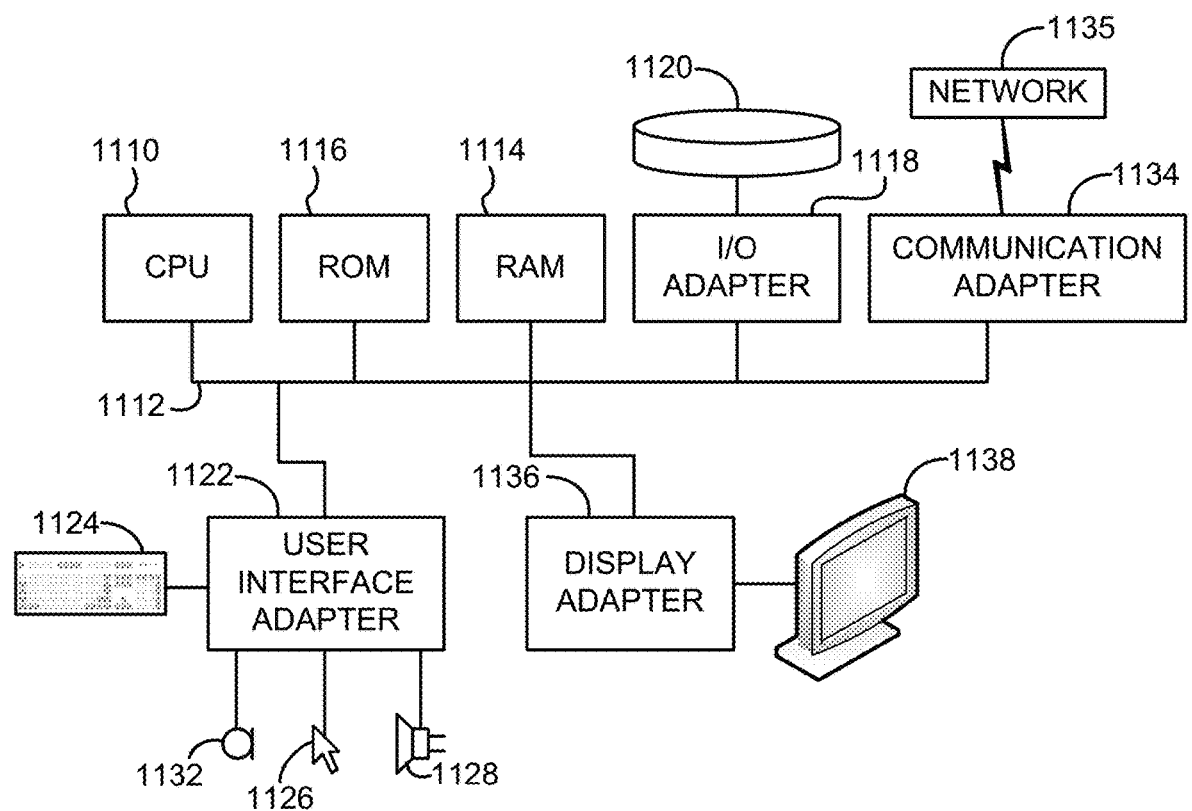
FIG. 11 is a representative hardware environment that may be associated with the servers and/or clients of FIG. 10, in accordance with one embodiment.

FIG. 11 shows a representative hardware environment associated with a user device 1016 and/or server 1014 of FIG. 10, in accordance with one approach. Such figure illustrates a typical hardware configuration of a workstation having a central processing unit 1110, such as a microprocessor, and a number of other units interconnected via a system bus 1112.

The workstation shown in FIG. 11 includes a Random Access Memory (RAM) 1114, Read Only Memory (ROM) 1116, an input/output (I/O) adapter 1118 for connecting peripheral devices such as disk storage units 1120 to the bus 1112, a user interface adapter 1122 for connecting a keyboard 1124, a mouse 1126, a speaker 1128, a microphone 1132, and/or other user interface devices such as a touch screen and a digital camera (not shown) to the bus 1112, communication adapter 1134 for connecting the workstation to a communication network 1135 (e.g., a data processing network) and a display adapter 1136 for connecting the bus 1112 to a display device 1138.

The workstation may have resident thereon an operating system such as the Microsoft Windows® Operating System (OS), a MAC OS, a UNIX OS, etc. It will be appreciated that a preferred approach may also be implemented on platforms and operating systems other than those mentioned. A preferred approach may be written using eXtensible Markup Language (XML), C, and/or C++ language, or other programming languages, along with an object oriented programming methodology. Object oriented programming (OOP), which has become increasingly used to develop complex applications, may be used.

Figure 12:
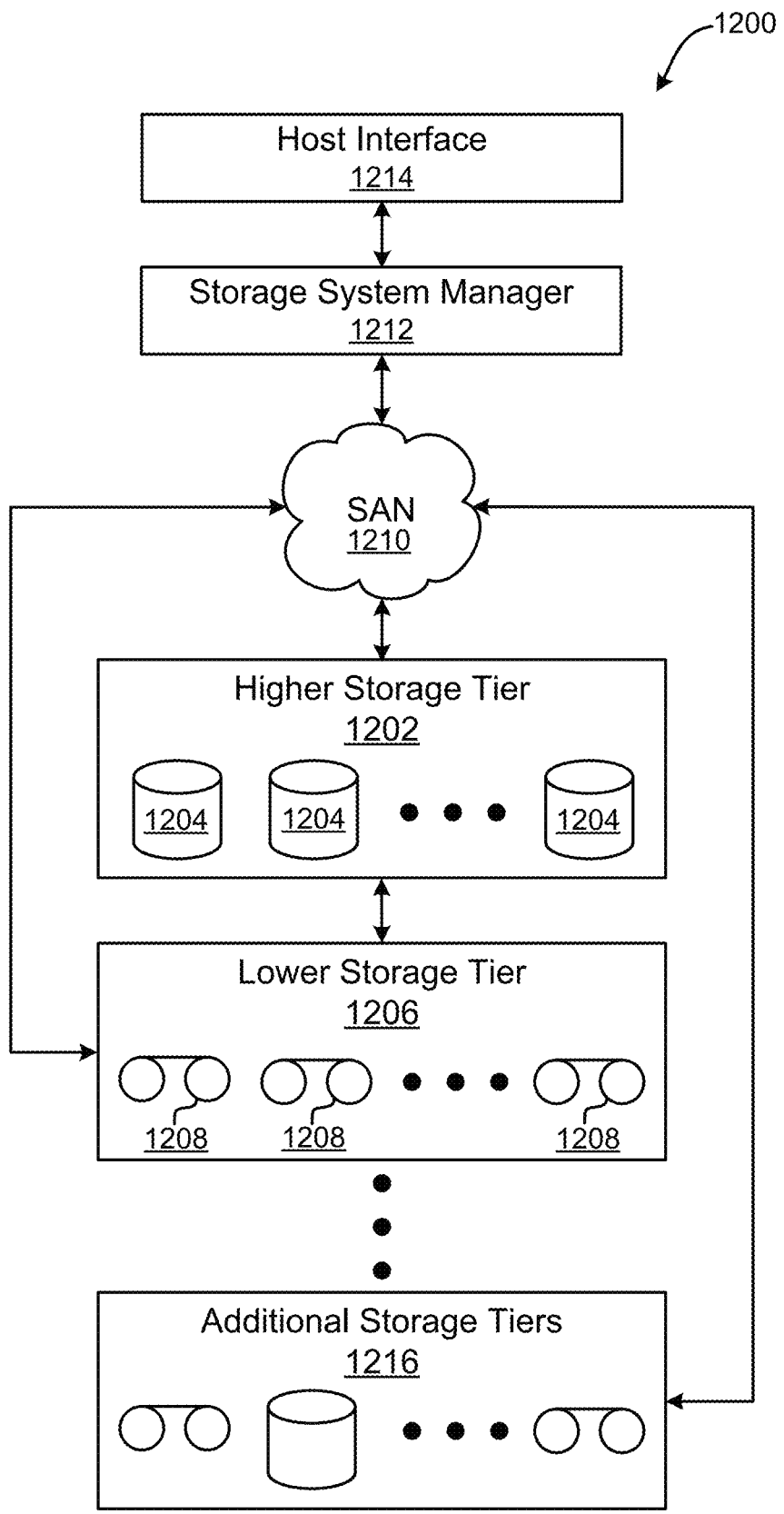
FIG. 12 is a representational view of a multi-tiered data storage system in accordance with one embodiment.

Now referring to FIG. 12, a high level representation of a storage system 1200 is shown according to one embodiment. Note that some of the elements shown in FIG. 12 may be implemented as hardware and/or software, according to various approaches. The storage system 1200 may include a storage system manager 1212 for communicating with a plurality of media and/or drives on at least one higher storage tier 1202 and at least one lower storage tier 1206. The higher storage tier(s) 1202 preferably may include one or more random access and/or direct access hardware-based data storage devices, e.g., higher storage media 1204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 1206 may preferably include one or more lower performing hardware-based data storage devices, e.g., lower storage media 1208, including sequential access media such as magnetic tape in tape drives and/or optical media, slower accessing HDDs, slower accessing SSDs, etc., and/or others noted herein or known in the art. Accordingly, "higher" and "lower" are intended to at least be with respect to each other. In other words, the higher storage media 1204 in the higher storage tier(s) 1202 is at least higher performing than the lower storage media 1208 in the lower storage tier(s) 1206. Depending on the approach, "performance" as used to distinguish between the hither storage media 1204 in the higher storage tier(s) 1202 and the lower storage media 1208 in the lower storage tier(s) 1206 may be determined based on product literature, testing results, advertising material/statistics, etc.

Moreover, one or more additional storage tiers 1216 may include any combination of storage memory media as desired by a designer of the system 1200. Also, any of the higher storage tiers 1202 and/or the lower storage tiers 1206 may include some combination of storage devices and/or storage media.

The storage system manager 1212 may communicate with the drives and/or storage media 1204, 1208 on the higher storage tier(s) 1202 and lower storage tier(s) 1206 through a network 1210, such as a storage area network (SAN), as shown in FIG. 12, or some other suitable network type. The storage system manager 1212 may also communicate with one or more host systems (not shown) through a host interface 1214, which may or may not be a part of the storage system manager 1212. The storage system manager 1212 and/or any other component of the storage system 1200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 1200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 1202, may include a majority of SSD storage media for storing data in a higher performing storage environment, and remaining storage tiers, including lower storage tier 1206 and additional storage tiers 1216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1202, while data not having one of these attributes may be stored to the additional storage tiers 1216, including lower storage tier 1206. Of course, one of skill in the art, upon reading the present descriptions, may devise many other combinations of storage media types to implement into different storage schemes, according to the approaches presented herein.

According to some approaches, the storage system (such as 1200) may include logic configured to receive a request to open a data set, logic configured to determine if the requested data set is stored to a lower storage tier 1206 of a tiered data storage system 1200 in multiple associated portions, logic configured to move each associated portion of the requested data set to a higher storage tier 1202 of the tiered data storage system 1200, and logic configured to assemble the requested data set on the higher storage tier 1202 of the tiered data storage system 1200 from the associated portions.

Of course, this logic may be implemented as a method on any device and/or system or as a computer program product, according to various approaches.

As described above, data is written to a sequential storage medium, such as a magnetic tape, by being appended to the end of whatever data has already been written on the medium. Moreover, as data stored on a magnetic tape is updated over time, the updates are also appended to the end of whatever data has already been written on the magnetic tape, as opposed to actually replacing (overwriting) the previous and now obsolete version of the data. As a result, files stored on the magnetic tape become fragmented as portions of the files are updated over time. Thus, despite originally having been written sequentially and in series, the data corresponding to a given file may be spread across the magnetic tape over time.

While read and/or write operations may still be successfully performed on a magnetic tape having file data which has experienced fragmentation, the process of copying fragmented data between magnetic tapes has conventionally faced significant setbacks. Data may be copied between magnetic tapes for a number of different reasons, e.g., such as upgrading the quality of a magnetic tape and/or reclaiming a particular magnetic tape. However, conventional products have been unable to efficiently perform such copying of fragmented data between magnetic tapes. Specifically, conventional products read each portion of each file individually before copying the combined portions of the file from one magnetic tape to another. Thus, the amount of time associated with copying data from one magnetic tape to another is significantly lengthened as the number of fragmented files on the source magnetic tape increases.

In an effort to avoid these latency spikes when copying data from one magnetic tape to another, attempts have been made by conventional products to use a cache as a staging area for the data on a magnetic tape before it is written to a second magnetic tape. Although these attempts reduced latency, they also significantly increased operating costs, as cache is significantly more expensive per unit of data than magnetic tape for instance. As the storage capacity of sequential storage media continues to increase, these conventional attempts require a cache which has a large enough capacity to store all of the data on a corresponding magnetic tape. For reference, the storage capacity of magnetic tape is currently upwards of 15 TB. Thus, these conventional attempts ultimately result in decreased efficiency and even degraded performance of the cache.

In sharp contrast to these shortcomings experienced by conventional products, various approaches described herein are able to reduce latency while copying data between magnetic tapes, as well as minimizing data consumption, e.g., as will be described in further detail below.

Figure 13:
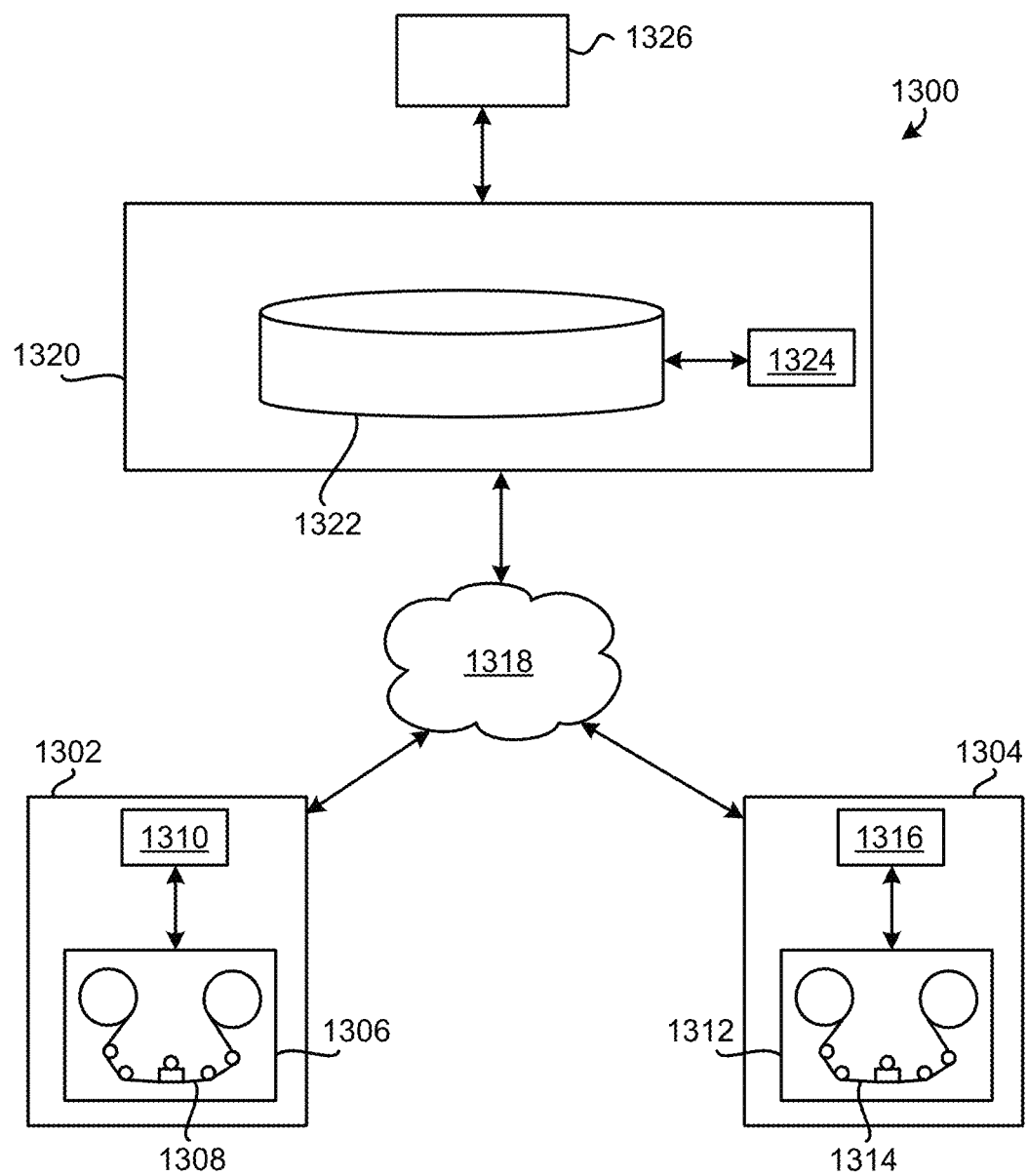
FIG. 13 is a representational high level view of an architecture for a storage system in accordance with one embodiment.

Looking to FIG. 13, a high level view of the architecture for a storage system 1300 is illustrated in accordance with one embodiment. As an option, the present storage system 1300 may be implemented in conjunction with features from any other approaches included herein, such as those described with reference to the other FIGS., such as FIG. 12. However, such storage system 1300 and others presented herein may be used in various applications and/or in permutations which may or may not be specifically described in the illustrative approaches listed herein. Further, the storage system 1300 presented herein may be used in any desired environment. Thus FIG. 13 (and the other FIGS.) may be deemed to include any possible permutation.

As shown, the storage system 1300 includes a first tape drive area 1302, and a second tape drive area 1304. Furthermore, the first tape drive area 1302 includes a first tape drive 1306, a first magnetic tape 1308 which is loaded in the first tape drive 1306, and a controller 1310 which is electrically (e.g., directly) coupled to the first tape drive 1306. Similarly, the second tape drive area 1304 includes a second tape drive 1312, a second magnetic tape 1314 which is loaded in the second tape drive 1312, and a controller 1316 which is electrically (e.g., directly) coupled to the second tape drive 1312.

It should be noted that the first and second tape drives 1306, 1312 may include any of the approaches described above with reference to FIG. 1A. Accordingly, the first and/or second tape drives 1306, 1312 may include a magnetic head having transducers for reading and/or writing to a magnetic tape, memory, fine and/or coarse actuators, etc. Moreover, although the controllers 1310, 1316 are preferably electrically coupled to each of the respective tape drives 1306, 1312 by a physical electrical connection (e.g., such as a cable, a fiber-optic link, a wire, etc.), in some approaches one or both of the controllers 1310, 1316 may be electrically coupled to each of the respective tape drives 1306, 1312 by a wireless connection (e.g., using Wi-Fi, Bluetooth, near-field communication (NFC), etc.).

The storage system 1300 further includes a higher storage tier area 1320 which has a cache 1322 and a controller 1324 electrically (e.g., directly) coupled thereto. It should be noted that in terms of the present description, "higher" is intended to at least be in comparison to the first and second tape drive areas 1302, 1304. In other words, the cache 1322 in the higher storage tier area 1320 is at least higher performing than the tape drives 1306, 1312. As described above, Depending on the approach, "performance" as used to distinguish between the cache 1322 and the tape drives 1306, 1312 may be determined based on product literature, testing, advertising material/statistics, in-use results, etc.

The first and second tape drive areas 1302, 1304 are illustrated as being connected by a network 1318. In other words, both of the first and second tape drive areas 1302, 1304 may be connected to the same network 1318, thereby allowing the first and second tape drive areas 1302, 1304 to be in communication with each other. Accordingly, the controllers 1310, 1316 at each of the tape drive areas 1302, 1304 may be able to communicate with each other (e.g., send information to and/or receive information from each other) through the network 1318. As shown, the higher storage tier area 1320 is also connected to the network 1318. Thus, the higher storage tier area 1320 may also be in communication with both of the first and second tape drive areas 1302, 1304, e.g., such that all of the controllers 1310, 1316, 1324 may be able to communicate with each other (e.g., send information to and/or receive information from each other) through the network 1318, e.g., as would be appreciated by one skilled in the art after reading the present description. Moreover, depending on the approach, the network 1318 may take any desired form including, but not limited to, a LAN, a WAN (e.g., such as the Internet), a PSTN, a SAN, an internal telephone network, etc.

The higher storage tier area 1320 is also illustrated as being connected to a host (e.g., user) 1326. Accordingly, information (e.g., requests, instructions, commands, etc.) may be received by the controller 1324, which may in turn process and/or direct the received information to the appropriate component in the storage system 1300 using the network 1318. As a result, different components included in system 1300 may be used to perform various data management processes depending on the approach, e.g., see FIGS. 14A-14D below. With continued reference to FIG. 13, although the data storage system 1300 is only coupled to one host 1326 in the present approach, any number of hosts, users, other storage systems, etc., may be coupled to the data storage system 1300 depending on the desired approach. Moreover, the host 1326 may be coupled to the data storage system 1300 using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description.

As mentioned above, various approaches described herein are able to reduce latency while copying data between magnetic tapes, as well as minimizing data consumption. Different copying procedures may be implemented based on characteristics of the data as it is stored on the magnetic tape, thereby desirably achieving an efficient and adaptive process of copying data between magnetic tapes. Looking to FIG. 14A, a method 1400 for copying fragmented files and non-fragmented files from a first magnetic tape (also referred to as a "source magnetic tape") to a second magnetic tape is illustrated in accordance with one embodiment. The method 1400 may be performed in accordance with the present invention in any of the environments depicted in FIGS. 1-13, among others, in various approaches. Of course, more or less operations than those specifically described in FIG. 14A may be included in method 1400, as would be understood by one of skill in the art upon reading the present descriptions.

Each of the steps of the method 1400 may be performed by any suitable component of the operating environment.

For example, in some approaches one or more of the processes included in method 1400 may be performed by a computer (e.g., a controller) coupled to one or more storage components (e.g., cache, one or more tape drives, etc.) of a storage system (e.g., see FIG. 13 above). In various other approaches, the method 1400 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1400. Illustrative processors include, but are not limited to, a central processing unit (CPU), an application specific integrated circuit (ASIC), a field programmable gate array (FPGA), etc., combinations thereof, or any other suitable computing device known in the art.

Figure 14A:
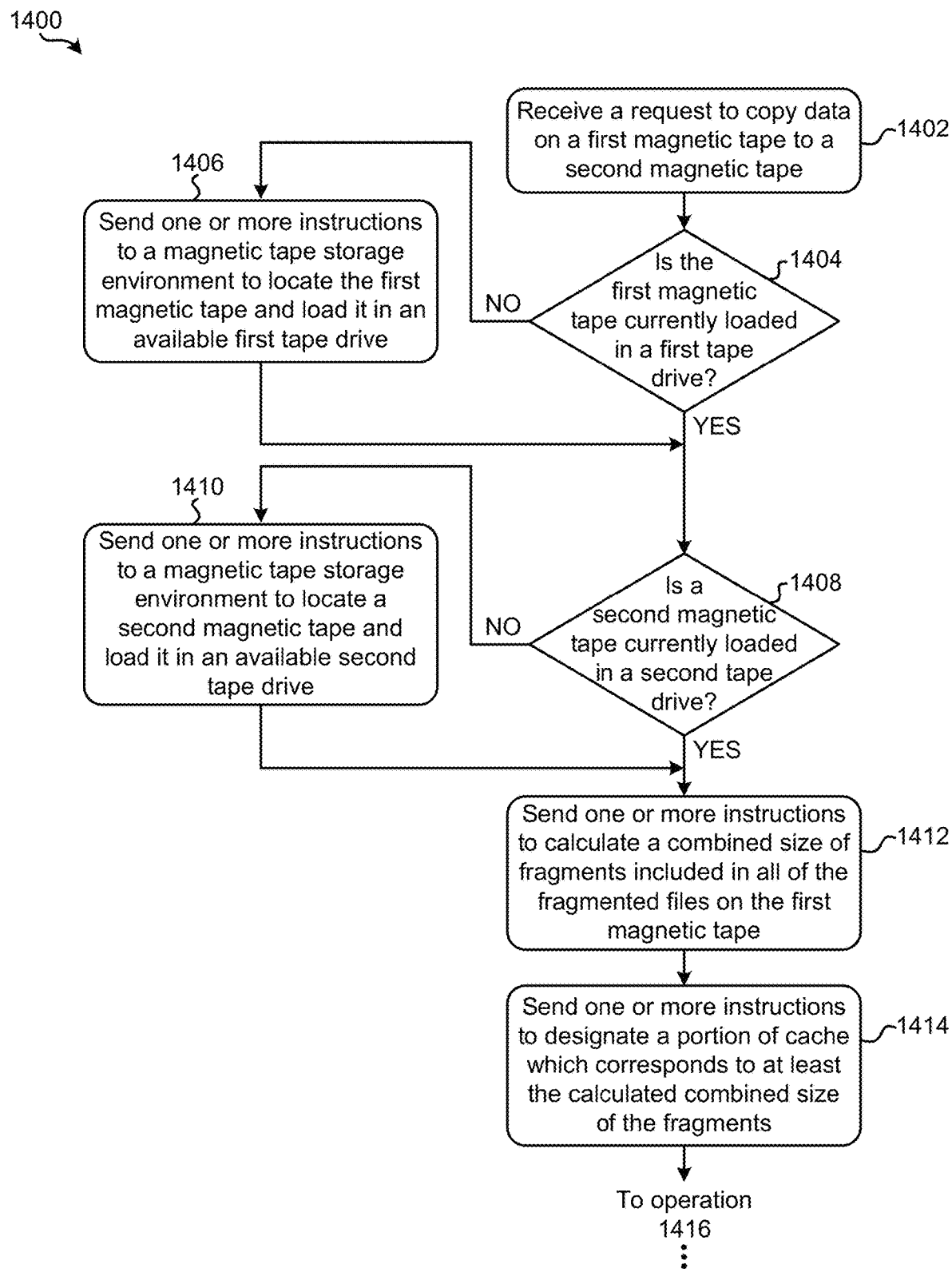
FIG. 14A is a flowchart of a method in accordance with one embodiment.
Figure 14A:
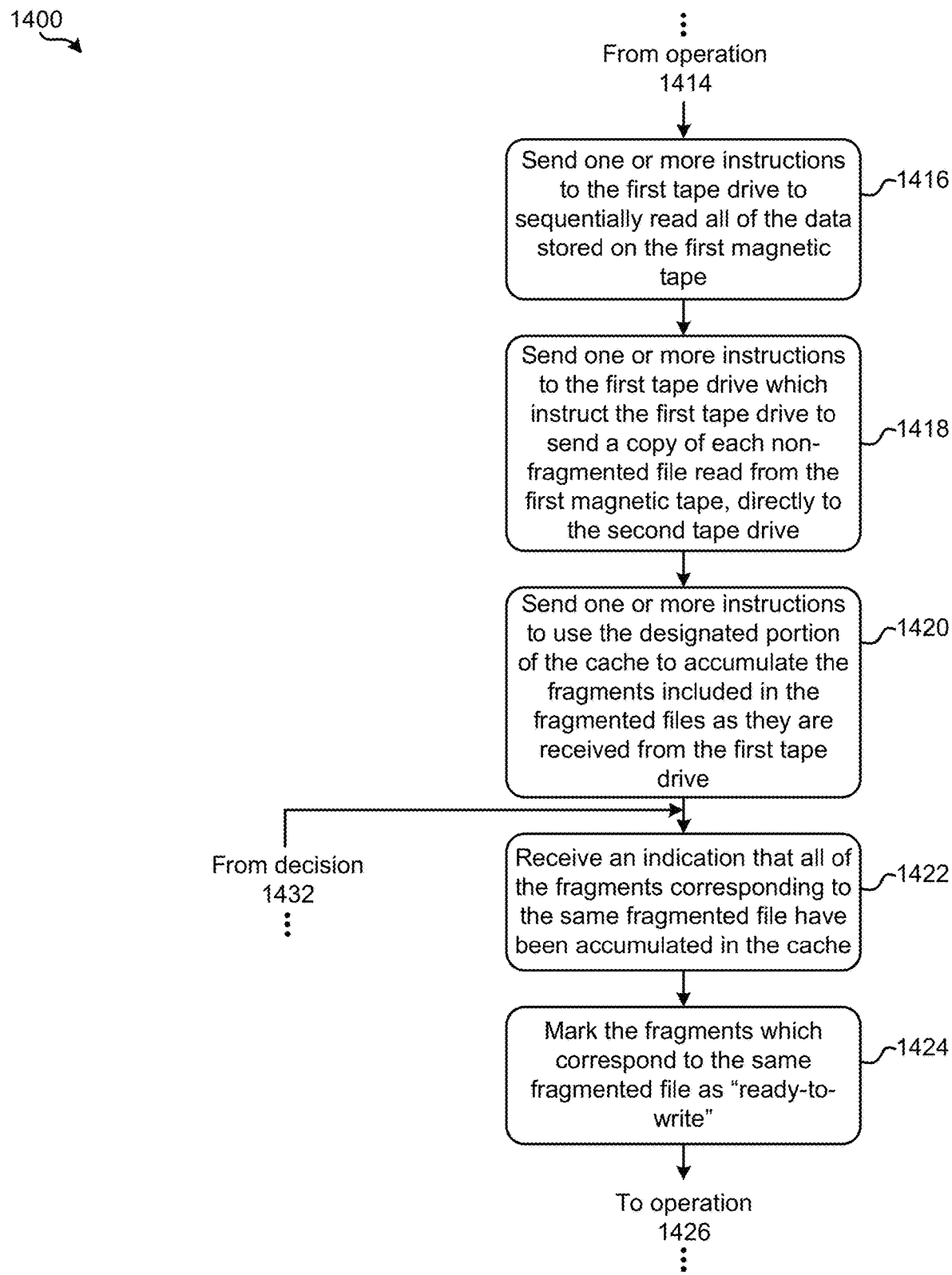
Figure 14A:
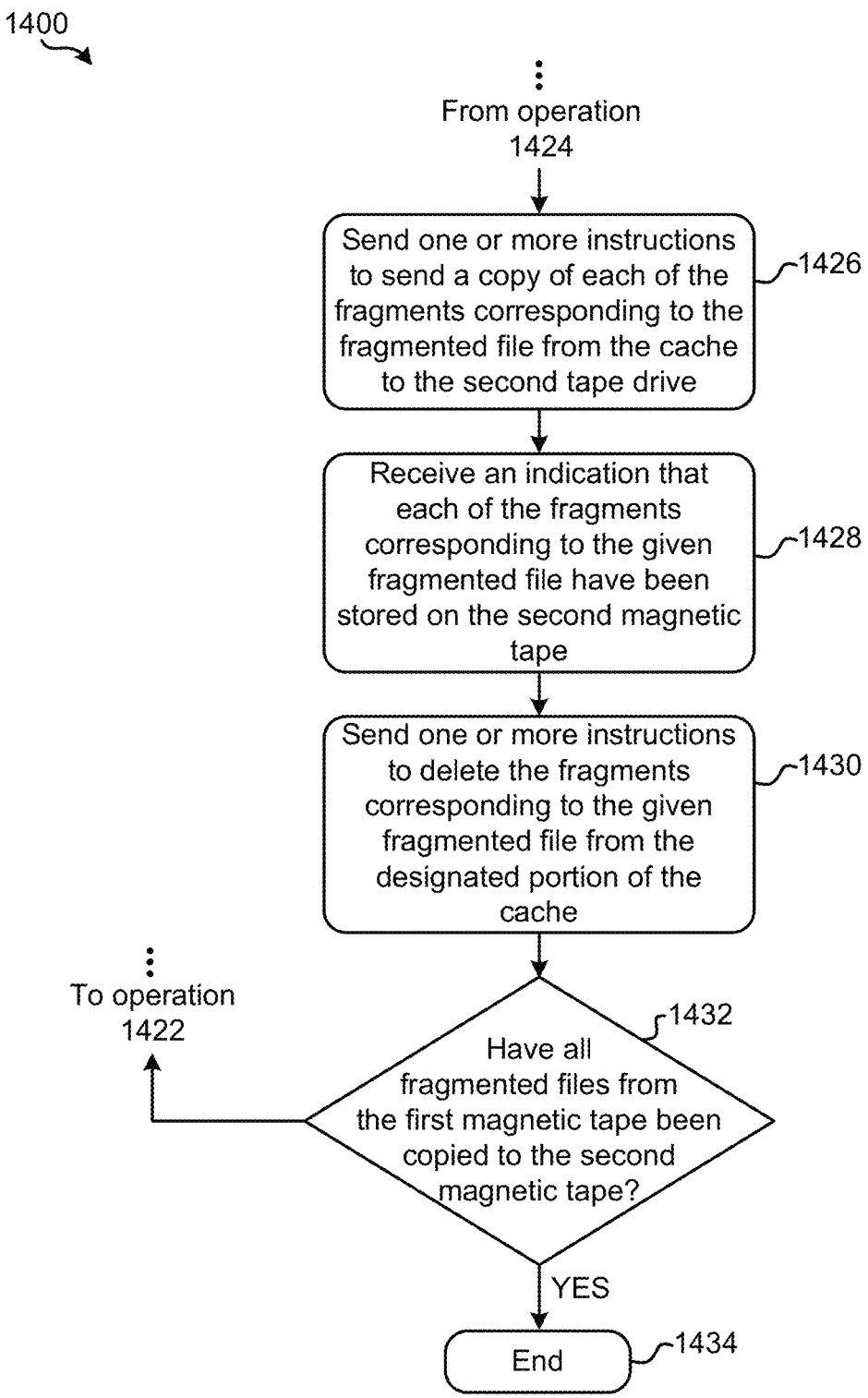

As shown in FIG. 14A, operation 1402 of method 1400 includes receiving a request to copy data on a first magnetic tape to a second magnetic tape. Depending on the approach, the copy request may be received from a host, a user, a controller in another storage system, etc. Once the copy request has been received, a determination may be made as to whether the magnetic tape corresponding to the received request is currently loaded (e.g., mounted) in a tape drive. Accordingly, decision 1404 includes determining whether the first magnetic tape corresponding to the received copy request is currently loaded in a tape drive. This determination may be made by referencing a lookup table in memory which tracks the current location of each magnetic tape in a tape library, sending a query to each of the tape drives in a storage system which asks whether the first magnetic tape corresponding to the received copy request is currently loaded therein, etc., depending on the approach.

As shown, method 1400 proceeds to operation 1406 in response to determining that the first magnetic tape corresponding to the received copy request is not currently loaded in a tape drive. There, operation 1406 includes sending one or more instructions to a magnetic tape storage environment (e.g., library) to locate the first magnetic tape and load it in an available tape drive. Accordingly, a robotic accessor configured to navigate a magnetic tape library may be used to located the first magnetic tape, access the first magnetic tape (e.g., grasp a cartridge in which the first magnetic tape is stored using a gripper assembly), and transport the first magnetic tape to a tape drive. Once the first magnetic tape has been delivered to the tape drive, the magnetic tape may be loaded into the tape drive such that it is ready to be read from.

From operation 1406, method 1400 proceeds to decision 1408. However, method 1400 also proceeds to decision 1408 in response to determining that the first magnetic tape corresponding to the received copy request is currently loaded in a tape drive. There, decision 1408 includes determining whether a second magnetic tape is loaded in a second tape drive. The flowchart proceeds to operation 1410 in response to determining that a second magnetic tape is not loaded in a second tape drive, where operation 1410 includes sending one or more instructions to a magnetic tape storage environment (e.g., library) to locate a second magnetic tape and load it in another available tape drive. Because the second magnetic tape may be used to copy data stored on the first magnetic tape, it may be desirable that the second magnetic tape is empty, e.g., does not have any user data stored thereon. Moreover, as mentioned above, data may be copied between magnetic tapes for a number of different reasons, e.g., such as upgrading the quality of the magnetic tape on which the data is stored. Thus, the second magnetic tape may also preferably have an updated configuration, a larger capacity, increased storage density, etc., e.g., at least in comparison to the first magnetic tape.

Figures 15, 16A, 16B:
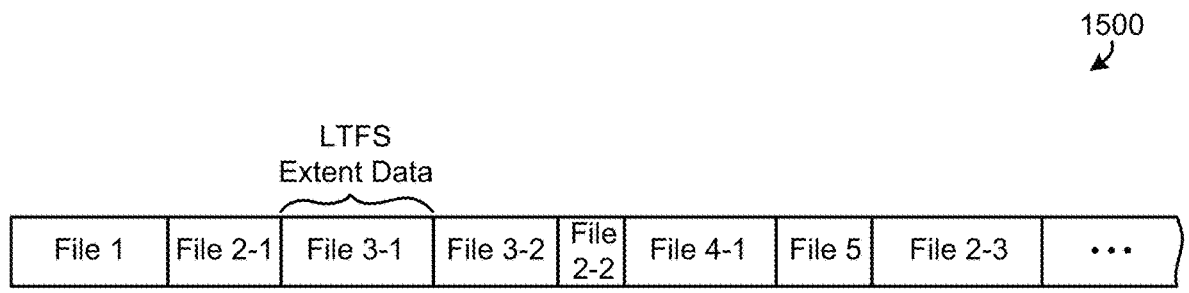
FIG. 15 is a partial representational view of a magnetic tape in accordance with one embodiment.
FIG. 16A is a representational view of a file list in accordance with one embodiment.
FIG. 16B is a representational view of a file list in accordance with one embodiment.

Method 1400 also includes sending one or more instructions to calculate a combined size of fragments included in all of the fragmented files on the first magnetic tape. See operation 1412. Again, as data stored on a magnetic tape is updated over time, the updated portions of originally written data are appended to the end of the data currently stored on the magnetic tape in a sequential manner. Thus, files (portions of data which correspond to each other) may become fragmented as portions thereof are progressively updated. Referring momentarily to FIG. 15, a representative view of a portion of a magnetic tape 1500 is illustrated in accordance with an exemplary approach, which is in no way intended to limit the invention. As shown, some of the files may remain on the magnetic tape as a single data extent (contiguous sequence of recorded data blocks), e.g., such as File 1. Other files may be spread across more than one sequential data extent which may be caused by one or more updates to the file, a large file size, etc., e.g., see File 3-1 and File 3-2. Still other files may be spread across more than one non-sequential data extent, or "fragment", which may be caused by one or more updates to the file over time, e.g., see File 2-1, File 2-2, and File 2-3. In other words, files having data extents which are all sequentially arranged relative to each other on the magnetic tape are preferably not considered "fragments" according to the various approaches included herein. However, in alternative approaches, all data extents may be considered fragments.

Referring back to FIG. 14A, the combined size of the fragments included in all of the fragmented files on the first magnetic tape may be calculated in order to determine how much memory to reserve in cache. It should be noted that "fragments" preferably includes non-sequential data extents as described in relation to FIG. 15. By calculating a combined size of all the fragments on the first magnetic tape, a corresponding amount of space may be reserved in cache such that each of the fragments (non-sequential data extents) may be accumulated in the cache before being written to the second magnetic tape. As a result, the efficiency by which fragmented files may be copied from the first magnetic tape to the second magnetic tape may by significantly improved, e.g., as will be described in further detail below.

According to some approaches, the combined size of the fragments included in all of the fragmented files on the first magnetic tape may be calculated using the information available in an LTFS index. For instance, the total number, length (e.g., size), location, etc. of fragments included in each of the fragmented files on a given magnetic tape may be stored in a LTFS index corresponding to the magnetic tape. However, the combined size of the fragments included in all of the fragmented files on the first magnetic tape may be calculated using any other processes which would be apparent to one skilled in the art after reading the present description.

Calculating the combined size of the fragments included in all of the fragmented files on a magnetic tape may be based on a number and size of the fragments in the fragmented files. Moreover, calculating the combined size of the fragments may also be based, at least in part, on a position of the first magnetic tape relative to a magnetic head in the first tape drive. For instance, in some approaches the first tape drive may begin reading data (e.g., files) from the first magnetic tape starting at a current location of the magnetic head in the first tape drive relative to the first magnetic tape, and reading sequentially towards an end of the first magnetic tape. Moreover, once the end of the first magnetic tape is reached, the first tape drive may return to a beginning of the first magnetic tape and read sequentially towards the location where the magnetic head began reading, thereby reading all of the data stored on the first magnetic tape. However, in other approaches the first tape drive may rewind the first magnetic tape from a current location, to a beginning of tape and begin sequentially reading data from the first magnetic tape towards the end of tape. Accordingly, the order in which the data is actually read from the magnetic tape may have at least somewhat of an effect on how the combined size of the fragments included in all of the fragmented files on the magnetic tape is calculated.

Figure 14B:
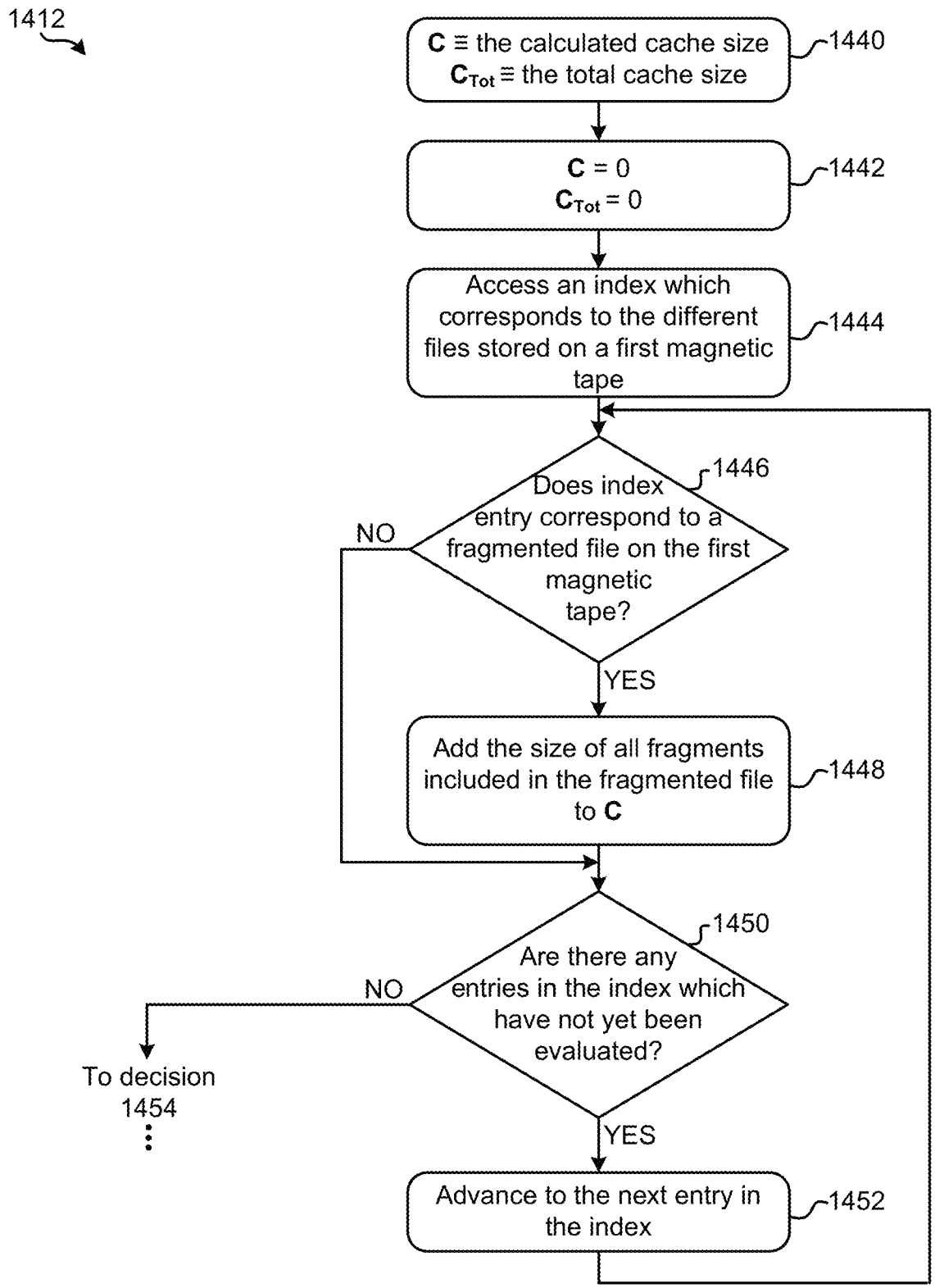
FIG. 14B is a flowchart of sub-processes associated with performing one of the operations in FIG. 14A.
Figure 14B:
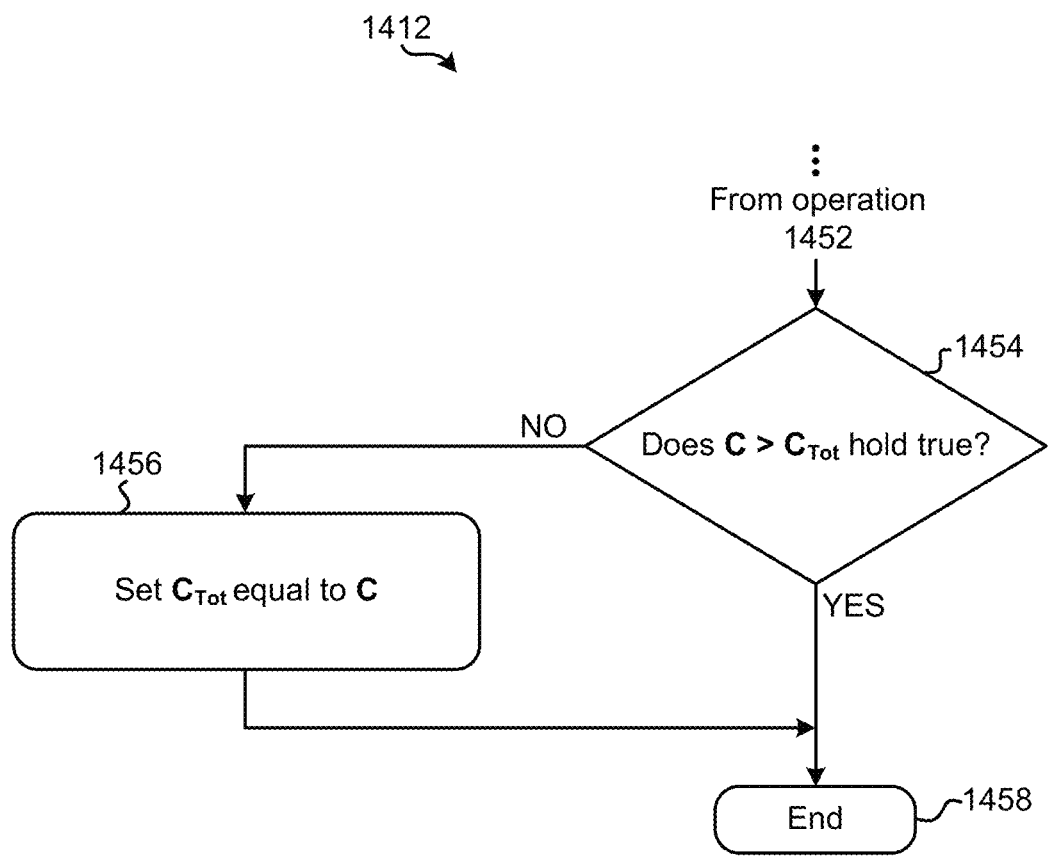

Looking to FIG. 14B, exemplary processes for calculating the combined size of the fragments included in all of the fragmented files on a magnetic tape are illustrated in accordance with an exemplary approach. Accordingly, one or more of the processes included in FIG. 14B may be used to perform the calculation requested by operation 1412 of FIG. 14A. However, it should be noted that the processes of FIG. 14B are illustrated in accordance with one exemplary approach which is in no way intended to limit the invention. Moreover, any one or more of the processes of FIG. 14B may be performed by a controller, a processor, etc., or some other device having one or more processors therein which is implemented at the location where the one or more instructions corresponding to operation 1412 are sent to. Illustrative processors include, but are not limited to, a central processing unit (CPU), an application specific integrated circuit (ASIC), a field programmable gate array (FPGA), etc., combinations thereof, or any other suitable computing device known in the art.

As shown, FIG. 14B includes assigning a variable to represent the calculated cache size C and a variable to represent the total cache size $C_{Tot}$. See operation 1440. Moving to operation 1442, both the calculated cache size C and the total cache size $C_{Tot}$ are initially set equal to zero.

Operation 1444 includes accessing an index which corresponds to the different files stored on a first (source) magnetic tape. According to some approaches, each of the entries in the index may correspond to a fragment on the first magnetic tape. Moreover, each of the entries in the index may denote a start position, a size (e.g., amount of data), a corresponding file, etc., of the respective fragment. For example, in some approaches the index may be a LTFS index, e.g., as would be appreciated by one skilled in the art after reading the present description. Moreover, the LTFS index may correspond to any desired format. For instance, in some approaches the LTFS index may be stored (e.g., written) in XML format. Thus, each of the fragments represented in the LTFS index may be represented as an extent. It also follows that the number of fragments on a magnetic tape may be calculated using the extent data in an LTFS index, thereby desirably avoiding any evaluation of the degree of fragmentation at the time of reading as well as preventing any overestimation of the total number of fragments on the magnetic tape. Moreover, in some approaches the index may not be accessible by the processor performing various ones of the processes included in FIG. 14B. Accordingly, in some approaches operation 1444 may include sending one or more instructions to access an index which corresponds to the different files stored on a first (source) magnetic tape.

Referring still to FIG. 14B, decision 1446 includes determining whether an entry in the index corresponds to a fragmented file on the first magnetic tape. It is preferred that decision 1446 begins with evaluating a first entry in the index, but any entry in the index may be evaluated initially depending on the preferred approach. The flowchart proceeds to operation 1448 in response to determining that the entry in the index corresponds to a fragmented file, whereby the size of all fragments included in the fragmented file are added to the calculated cache size C. In other words, the size of the whole fragmented file is added to the calculated cache size C in response to determining that the entry in the index being evaluated corresponds to a fragmented file.

However, as mentioned above, as data stored on a magnetic tape is updated over time, the updates are also appended to the end of whatever data has already been written on the magnetic tape, as opposed to actually replacing (overwriting) the previous and now obsolete version of the data. Accordingly, both valid and invalid fragments corresponding to the same file may be stored on the magnetic tape. Thus, it should be noted that "all fragments" as used herein may refer to both the valid and invalid fragments which correspond to a given file in some approaches, while in other approaches "all fragments" may only refer to the valid fragments (which have not been replaced or overwritten) which correspond to a given file.

From operation 1448, the flowchart proceeds to decision 1450 which includes determining whether there is another entry in the index which has not yet been evaluated. As mentioned above, it is preferred that a first entry in the index is evaluated initially, but any entry in the index may be evaluated initially depending on the preferred approach. Accordingly, decision 1450 may not necessarily translate to whether there is a subsequent entry in the list. Rather, decision 1450 may determine whether there are any entries in the list which have not yet been evaluated. It should also be noted that because the size of the whole fragmented file is added to the calculated cache size C in response to determining that the entry in the index being evaluated corresponds to a fragmented file, subsequent entries in the index which correspond to the same fragmented file (if there are any) may be skipped over. This desirably avoids the same fragmented file from being evaluated more than once as well as preventing the designated portion of the cache from being unnecessarily large, thereby reducing memory consumption, increasing efficiency, reducing run-time of the flowchart in FIG. 14B, etc.

As shown, FIG. 14B proceeds to operation 1452 in response to determining that there is another entry in the index which has not yet been evaluated. There, operation 1452 includes advancing to the next entry in the index. Thereafter, the flowchart returns to decision 1446 such that processes 1446, 1448, 1450 and 1452 may be repeated for the next entry in the index.

Returning to decision 1450, the flowchart proceeds to decision 1454 in response to determining that all the entries in the index have been evaluated. As shown, decision 1454 includes determining whether the calculated cache size C is greater than the total cache size $C_{Tot}$. In other words, decision 1454 determines whether the mathematical relationship $C > C_{Tot}$ holds true. FIG. 14B jumps to operation 1458 in response to determining that the calculated cache size C is not greater than the total cache size $C_{Tot}$, whereby the flowchart may end. However, the flowchart does proceed to operation 1456 from decision 1454 in response to determining that the calculated cache size C is not greater than the total cache size $C_{Tot}$. There, operation 1456 includes setting the total cache size $C_{Tot}$ equal to the calculated cache size C, after which FIG. 14B proceeds to operation 1458 and the flowchart may end. However, it should be noted that although the flowchart may end upon reaching operation 1458, any one or more of the processes included in FIG. 14B may be repeated in order to calculating the combined size of the fragments included in all of the fragmented files on a different magnetic tape. In other words, any one or more of the processes included in FIG. 14B may be repeated for additional magnetic tapes as desired.

As a result, the total cache size $C_{Tot}$ calculated by implementing various ones of the processes included in FIG. 14B may effectively be used as the combined size of fragments included in all of the fragmented files on the first magnetic tape as seen in method 1400. However, the combined size of fragments included in all of the fragmented files on the first magnetic tape may be calculated (e.g., determined) differently depending on the desired approach.

Figure 14C:
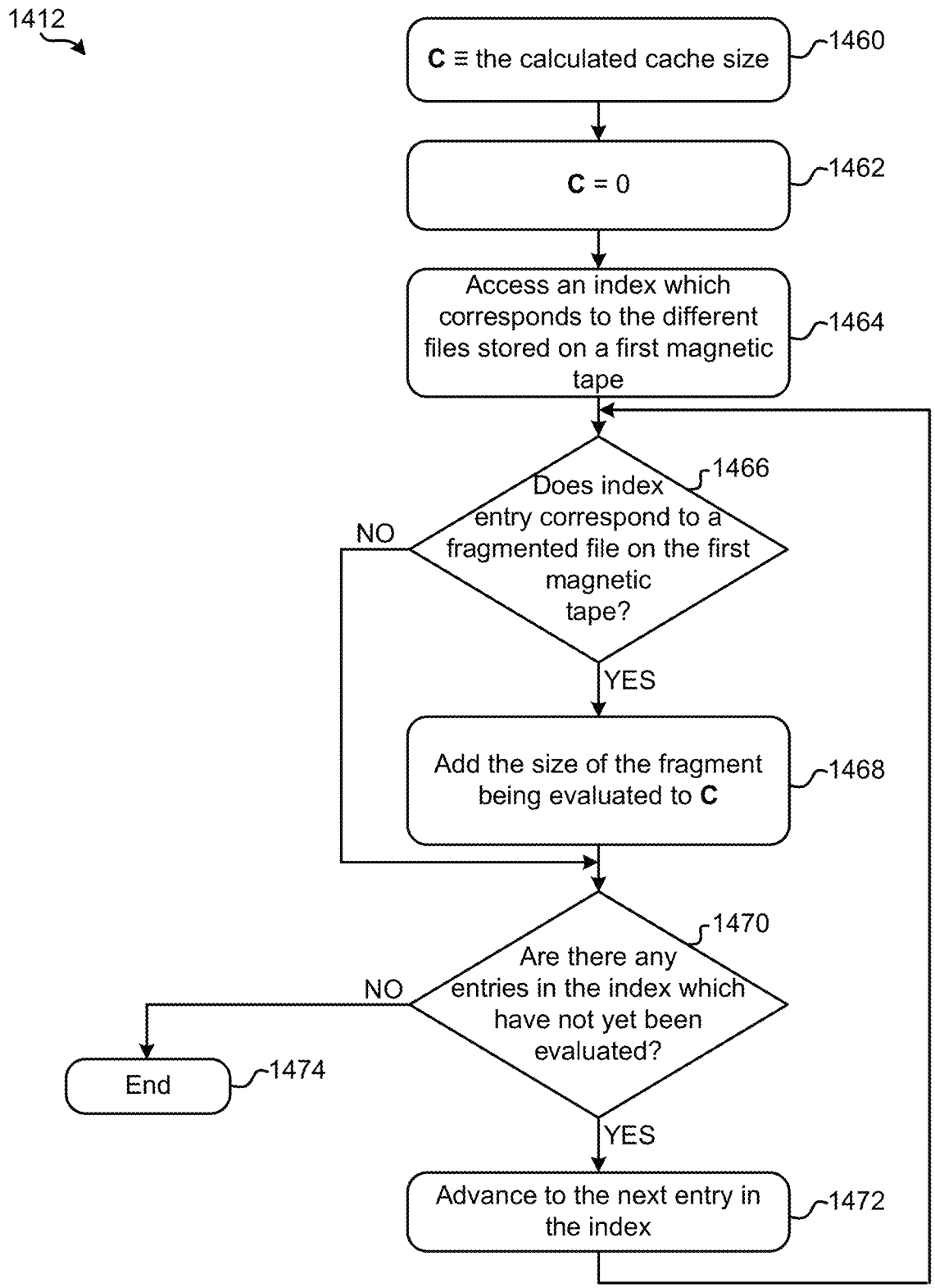
FIG. 14C is a flowchart of sub-processes associated with performing one of the operations in FIG. 14A.

For instance, looking to FIG. 14C, exemplary processes for calculating the combined size of the fragments included in all of the fragmented files on a magnetic tape are illustrated in accordance with another exemplary approach. Accordingly, one or more of the processes included in FIG. 14C may be used to perform the calculation requested by operation 1412 of FIG. 14A. However, it should be noted that the processes of FIG. 14C are illustrated in accordance with one exemplary approach which is in no way intended to limit the invention. Moreover, any one or more of the processes of FIG. 14C may be performed by a controller, a processor, etc., or some other device having one or more processors therein which is implemented at the location where the one or more instructions corresponding to operation 1412 are sent to. Illustrative processors include, but are not limited to, a central processing unit (CPU), an application specific integrated circuit (ASIC), a field programmable gate array (FPGA), etc., combinations thereof, or any other suitable computing device known in the art.

As shown, FIG. 14C includes assigning a variable to represent the calculated cache size C. See operation 1460. Moving to operation 1462, the calculated cache size C is initially set equal to zero. Furthermore, operation 1464 includes accessing an index which corresponds to the different files stored on a first (source) magnetic tape. According to some approaches, each of the entries in the index may correspond to a fragment on the first magnetic tape. Moreover, each of the entries in the index may denote a start position, a size (e.g., amount of data), a corresponding file, etc., of the respective fragment. For example, see the file list in FIG. 16A below.

Referring still to FIG. 14C, decision 1466 includes determining whether an entry in the index corresponds to a fragmented file on the first magnetic tape. It is preferred that decision 1466 begins with evaluating a first entry in the index, but any entry in the index may be evaluated initially depending on the preferred approach. The flowchart proceeds to operation 1468 in response to determining that the entry in the index corresponds to a fragmented file, whereby the size of the fragment being evaluated (e.g., corresponding to the index entry evaluated in decision 1466) is added to the calculated cache size C. In other words, only the size of the fragment is added to the calculated cache size C.

From operation 1468, the flowchart proceeds to decision 1470 which includes determining whether there is another entry in the index which has not yet been evaluated. As mentioned above, it is preferred that a first entry in the index is evaluated initially, but any entry in the index may be evaluated initially depending on the preferred approach. Accordingly, decision 1470 may not necessarily translate to whether there is a subsequent entry in the list. Rather, decision 1470 may determine whether there are any entries in the list which have not yet been evaluated. FIG. 14C proceeds to operation 1472 in response to determining that there is another entry in the index which has not yet been evaluated. There, operation 1472 includes advancing to the next entry in the index. Thereafter, the flowchart returns to decision 1466 such that processes 1466, 1468, 1470 and 1472 may be repeated for the next entry in the index.

Returning to decision 1470, the flowchart proceeds to operation 1474 and the flowchart may end. However, it should be noted that although the flowchart may end upon reaching operation 1474, any one or more of the processes included in FIG. 14C may be repeated in order to calculating the combined size of the fragments included in all of the fragmented files on a different magnetic tape. In other words, any one or more of the processes included in FIG. 14C may be repeated for additional magnetic tapes as desired.

As a result, the total cache size $C_{Tot}$ calculated by implementing various ones of the processes included in FIG. 14C may effectively be used as the combined size of fragments included in all of the fragmented files on the first magnetic tape as seen in method 1400. However, the combined size of fragments included in all of the fragmented files on the first magnetic tape may be calculated (e.g., determined) differently depending on the desired approach.

It should also be noted that the act of actually writing the data stored in cache onto the second magnetic tape takes time to perform. Accordingly, this writing time may also be incorporated when calculating the size of the combined size of the fragments included in all of the fragmented files on the first magnetic tape, while the size may actually be subtracted. According to an example, which is in no way intended to limit the invention, the tape write speed "S" may be represented in units of bytes/second. Moreover, "FZsize" is the size of File Z as obtained from a second file list (e.g., see file list 1650 of FIG. 16B) and represented in units of bytes/second, while "FXsize" is the size of File X as obtained from a first file list (e.g., see file list 1600 of FIG. 16A) and also represented in units of bytes/second. With this information, the calculated cache size C may be determined using Equation 1.1 and Equation 1.2 together, as represented below.

$$C=C-S \times FZ\text{size} \qquad \text{Equation 1.1}$$

$$C=C+FX\text{size} \qquad \text{Equation 1.2}$$

Moreover, as described above, it is determined whether the mathematical relationship $C>C_{Tot}$ holds true. In response to determining that the calculated cache size C is not greater than the total cache size $C_{Tot}$, the total cache size $C_{Tot}$ is not changed. However, in response to determining that the calculated cache size C is greater than the total cache size $C_{Tot}$, the total cache size $C_{Tot}$ is preferably set equal to the calculated cache size C.

It follows that the tape write speed may be determined by the latest generation of magnetic tape in the system and the file size that is to be written. In some approaches the data transfer rate between the cache and the second tape drive may be ignored because this data transfer rate is usually faster than the tape write speed in general. Moreover, the tape write speed may depend on a tape media generation. Accordingly, the tape write speed of the latest generation magnetic tape may be used when dealing with migration of data from older generation magnetic tapes to newer generation magnetic tapes (e.g., at least relative to each other). However, a user may be able to select the tape write speed depending on the desired approach.

With continued reference to FIG. 14A, calculating an accurate representation of the combined size of the fragments included in all of the fragmented files on the first magnetic tape is desirable, as storage space in cache is valuable. Thus, by not overestimating how much cache may be used, the approaches herein are able to reduce memory consumption and improve the efficiency at which the cache operates. In still another approach, data may not be transferred from the cache to the second magnetic tape while copy operations are being made. Moreover, the size of only the fragmented files may be added to each other in order to calculate the total cache size $C_{Tot}$, e.g., as would be appreciated by one skilled in the art after reading the present description.

Moreover, it should be noted that although operation 1412 is illustrated in FIG. 14A as being performed after the copy request is received in operation 1402, in other approaches the combined size of fragments included in all of the fragmented files on a magnetic tape may be calculated before a copy request is received. For example, one or more instructions may be sent to calculate a combined size of fragments included in all of the fragmented files on the first magnetic tape periodically, such that a combined size of the fragments is available for use upon receiving a copy request. For example, the combined size of fragments included in all of the fragmented files on the first magnetic tape may be calculated after an amount of time has passed, based on magnetic tape inventory commands, each time a tape unmount is performed, etc. In some approaches, the combined size of the fragments may be calculated and stored in memory, such that it may be accessed when desired. Thus, rather than calculating the combined size of the fragments, operation 1412 may include accessing the pre-calculated combined size of the fragments from memory. In some approaches the calculated combined size of the fragments may overwrite the previous value when stored in memory, while in other approaches each of the calculated combined size of the fragments may be retained in memory, e.g., to use for analytics of the magnetic tape over time. It may be desirable to have the combined size of fragments included in all of the fragmented files on the first magnetic tape calculated prior to receiving a copy request, as at least one mount operation may be involved with loading the LTFS index which is used to make this calculation in some approaches, as mentioned above. It also takes time to actually make the calculation. Thus, it is preferable to calculate the combined size of fragments included in all of the fragmented files on the first magnetic tape before a copy request is received in order to reduce processing delay, increase efficiency, etc.

Proceeding to operation 1414, method 1400 also includes sending one or more instructions to designate (e.g., reserve) a portion of cache which corresponds to at least the combined size of the fragments calculated in operation 1412. In other words, operation 1414 includes designating an amount of storage in cache which is at least equal to the calculated combined size of the fragments included in all of the fragmented files on the first magnetic tape. Accordingly, each of the fragmented files may be accumulated in the cache without risk of running out of room and/or effecting other data which may be stored in the cache. Again, by accumulating certain data on the first magnetic tape before copying it to the second magnetic tape, fragmentation of the data may be actively prevented on the second magnetic tape, thereby not only increasing the efficiency by which data on the first magnetic tape may be copied on the second magnetic tape, but also the efficiency by which read and/or write operations may be performed by the second magnetic tape.

However, it should be noted that because the above-mentioned total cache size $C_{Tot}$ may increase during use, the designated amount of storage in cache may be set and/or limited by a user. According to an example, the designated amount of storage in cache set by a user may be represented as $C_{User}$. Moreover, if the mathematical relationship $C_{User} < C_{Max}$ holds true, and the current amount of data currently stored in the cache is represented as $C_{Current}$, the amount of data being stored in the cache may be larger than $(C_{User} - C_{Current})$ which is the empty size of the cache. In this case, transfer of data (e.g., fragmented files) from the first magnetic tape to the cache may be halted. In other words, the first tape drive may be instructed to stop reading data from the first magnetic tape, e.g., as described above, in order to avoid overflowing the cache.

However, in some situations, rather than halting all data from being sent to the cache once a certain amount of the designated portion of cache has been filled, the first tape drive may be instructed to merely skip over fragments which correspond to fragmented files, fragments of which have not yet been accumulated in the cache. In other words, the tape drive may be instructed to only send fragments which correspond to fragmented files which already have fragments stored in the cache. Non-fragmented files may also still be sent directly to the second tape drive, as data corresponding to non-fragmented files is desirably not sent to the cache at all, and therefore is unaffected by the current status of the cache's capacity. The determination as to whether a given fragment should be skipped or sent to the cache may be made by referencing an LTFS index. Moreover, it should be noted that a current status corresponding to the file may be set as "Skip" to indicate that the fragmented file does not have any fragments stored in the cache yet, and accordingly has been skipped as a result of the cache becoming filled beyond a desired limit. It follows that files which are skipped over while the cache is undesirably full, may be reevaluated after the cache has been cleared a desired amount and returned to a "normal state", e.g., as will be described in further detail below.

In other approaches, rather than halting all data from being sent to the cache once a certain amount of the designated portion of cache has been filled, the first tape drive may be instructed to skip over fragments which include an amount of data which is larger than the remaining amount of available space in the designated portion of cache. This allows for additional fragments to be accumulated in the cache without exceeding the capacity of the designated portion of cache. Moreover, by allowing additional fragments to be accumulated in the cache, additional fragmented files may be complied and thereby become available to send to the second tape drive and deleted from the cache after being written to the second magnetic tape. This approach allows for added efficiency in clearing the cache despite being filled passed a desirable amount.

In still other approaches, data in cache which corresponds to certain fragments may be deleted to make room for data which corresponds to more desirable fragments. For instance, a fragment which is the only fragment in the cache which corresponds to a given fragmented file may be deleted from cache and marked as having been skipped. According to an example which corresponds to the representative view of a portion of a magnetic tape 1500 illustrated in FIG. 15, which is in no way intended to limit the invention, fragment 2.1 is the only fragment of fragmented file 2 which has been accumulated in the cache. Meanwhile, only one fragment of fragmented file 3 has yet to be accumulated in the cache. Accordingly, the data corresponding to fragment 2.1 may be deleted from the cache and marked as having been skipped, in order to make room for the data corresponding to the final fragment of fragmented file 3. Once the data corresponding to the final fragment of fragmented file 3 has been accumulated in the cache, fragmented file 3 may be sent to the second tape drive and deleted from the cache after being written to the second magnetic tape. This approach also allows for added efficiency in clearing the cache despite being filled passed a desirable amount.

It should be noted that fragments which are skipped over may be indicated as having been skipped in the LTFS index. Accordingly, data in fragments which were previously skipped over may be read by the first tape drive on a second pass of the magnetic tape before being sent directly to the second tape drive (in the case of a non-fragmented file) or sent to the cache to be accumulated therein (in the case of a fragmented file), e.g., according to the various approaches described herein. Rather than sequentially reading through the whole magnetic tape to arrive at the data corresponding to each of the fragments which were skipped over on the previous pass, the first tape drive may use the location information corresponding to each of the skipped fragments to more quickly access the data. For example, the first tape drive may use coarse and/or fine actuators to position the first magnetic tape such that the magnetic head in the first tape drive may read the data corresponding to each of the previously skipped fragments, e.g., as would be appreciated by one skilled in the art after reading the present description.

In some approaches, a recommended access order command may be used (e.g., performed) by the first tape drive to determine a data reading order in which discrete file fragments may be read efficiently from the first magnetic tape. Moreover, this efficient data reading order may be received (e.g., at a controller) from the first tape drive, and rearranged to further improve the efficiency by which previously skipped files may be read on a subsequent pass of a tape head in the first tape drive over the first magnetic tape. As a result, processing time, resource consumption, system loads, etc. may be reduced due to the lower access times involved with actually reading the data corresponding to previously skipped fragments. However, fragments which have not yet been read by the first tape drive may be prioritized differently in order to achieve one or more different improvements. For instance, rather than arranging the fragments such that they are prioritized to reduce access time, the fragments may be prioritized to increase the rate by which fragmented files may be accumulated in the cache and subsequently stored on the second magnetic tape, thereby reducing the amount of time involved with copying all the data from the first magnetic tape onto the second magnetic tape.

Referring still to method 1400, operation 1416 includes sending one or more instructions to the tape drive in which the first magnetic tape is mounted to sequentially read all of the data stored on the first magnetic tape. In other words, operation 1416 includes instructing the tape drive to reach each of the fragmented and non-fragmented files from the first magnetic tape in a sequential manner. In preferred approaches, the tape drive may advance or retrieve the magnetic tape such that a portion of data stored closest to the beginning of the magnetic tape is read first, moving sequentially thereafter towards the end of tape. However, in some approaches, the tape drive may begin reading the data stored on the first magnetic tape beginning from a current position on tape. In such approaches, when the end of the magnetic tape is reached, the tape drive may rewind the magnetic tape such that the data stored on the magnetic tape between the beginning of tape and the "current position" may also be read.

Furthermore, operation 1418 includes sending one or more instructions to the first tape drive which instruct the first tape drive to send a copy of each non-fragmented file read from the first magnetic tape, directly to a second tape drive in which the second magnetic tape is loaded (e.g., see decision 1408 and operation 1410 above). In other words, operation 1418 includes instructing the tape drive to send each non-fragmented file read from the first magnetic tape directly to the second tape drive. According to the present description, "directly" is intended to represent that data extents which correspond to non-fragmented files are sent to the second tape drive without first being sent to (e.g., accumulated in) the cache, unlike data extents which correspond to fragmented files which are sent to cache such that they may be accumulated, e.g., as will soon become apparent.

Directly copying data corresponding to non-fragmented files from one tape drive to another without moving the data through the cache and/or a host system is desirable as the load on the cache and/or host system is reduced, e.g., as would be appreciated by one skilled in the art after reading the present description. This allows for the cache and/or host system to maintain efficient performance, reduce resource (e.g., processing, memory, power, etc.) consumption, increase data transfer speeds, etc., while also ensuring that data stored on the second magnetic tape is done so in a non-fragmented manner. Thus, the characteristics of the data stored on the second magnetic tape as well as the efficiency by which operations may be performed using the second magnetic tape may be improved as a result of implementing the various approaches described herein. Moreover, the LTFS index may be updated at a later point after the direct transfer of the data corresponding to non-fragmented files is performed.

It follows that as each data extent is read from the first magnetic tape by a magnetic head of the tape drive, a determination may be made as to whether that data extent is a part of (e.g., corresponds to) a fragmented file or not. Depending on the approach, this determination may be made by the tape drive itself, a controller coupled thereto, a central controller, etc. Moreover, in response to determining that a data extent read from the first magnetic tape is part of a non-fragmented file, the tape drive may send that data extent, as well as the other data extents included in the same non-fragmented file, directly to the second tape drive such that the full non-fragmented file may be written sequentially to the second magnetic tape.

However, in response to determining that a data extent read from the first magnetic tape is part of a fragmented file, the tape drive preferably sends the data extent to the cache. As described above, the cache may include a designated portion which is large enough to store the data from all fragmented files on the first magnetic tape. There, data read from the first magnetic tape may be accumulated preferably such that each of the fragmented files may be defragmented before being sent to the second tape drive to be written on the second magnetic tape. Accordingly, operation 1420 includes sending one or more instructions to use the designated portion of the cache to accumulate the fragments included in the fragmented files as they are received from the first tape drive.

Once all of the fragments corresponding to a same fragmented file have been accumulated in (e.g., received by) the designated portion of cache, the fragments may be combined, thereby defragmenting the file which was stored on the source magnetic tape in a fragmented fashion. Accordingly, operation 1422 includes receiving an indication that all of the fragments corresponding to the same fragmented file have been accumulated in the cache. In some approaches, the indication in operation 1422 may be received from the cache itself upon determining that all of the fragments corresponding to the same fragmented file have been received and accumulated therein. In other approaches, the indication may be received from a controller coupled to the cache which may be managing the fragments of data included in the cache.

According to an exemplary approach, which is in no way intended to limit the invention, counters may be used to determine whether all of the fragments corresponding to any one or more of the fragmented files have been accumulated in the cache. According to the present description, a "counter" may include any desired combination of software and/or hardware which is able to keep track of a number of fragmented files which have been added to the cache and which correspond to the same fragmented file. Moreover, a counter may be assigned to each of the fragmented files on the first (source) magnetic tape, preferably such that each of the counters corresponds to a number of the fragments of a respective one of the fragmented files which have been accumulated in the designated portion of the cache. Thus, by comparing each of the number of counters with a total number of fragments in a respective one of the fragmented files, it may be determined whether all of the fragments corresponding to a fragmented file have been accumulated in the cache.

As described above, in some approaches the total number of fragments in each of the fragmented files is stored in a LTFS index. Accordingly, each of the counters may be compared to a corresponding total number of fragments in each of the fragmented files as stored in the LTFS index and/or a file list (e.g., see FIG. 16A) which may have been formed using the LTFS index. As a result, the determination that all of the fragments corresponding to a fragmented file have been accumulated in the cache may be made in response to determining that the counter corresponding to the given fragmented file is equal to the total number of fragments in the given fragmented file.

Furthermore, operation 1424 includes marking the fragments which correspond to the same fragmented file as "ready-to-write" in response to receiving the indication in operation 1422. It should be noted that the process of marking the fragments which correspond to a same fragmented file as "ready-to-write" is in no way intended to be limiting and may be performed differently depending on the approach. For instance, in some approaches certain fragments may be marked as "ready-to-write" by setting a flag corresponding thereto. In other approaches, a status indicator corresponding to the fragments may be changed from a status which indicates that they are being accumulated, to a status which indicates that they may be sent to the second tape drive, e.g., at an appropriate (desirable) time.

According to an exemplary approach, which is in no way intended to limit the invention, FIG. 16A shows file list 1600 which may be used to track the status of each file and/or fragment thereof. As mentioned above, the file list may be formed by using (e.g., reading) an LTFS index, e.g., as would be appreciated by one skilled in the art after reading the present description. Accordingly, the file list 1600 in FIG. 16A may be formed by reading an LTFS index corresponding to the magnetic tape being evaluated. The LTFS index may be read beginning with a first extent or first start block thereof, and working towards a last extent or end block.

As shown, each row of the file list 1600 corresponds to a different file. Moreover, each column includes a different type of information corresponding to the different files. Although in no way intended to be limiting, file list 1600 includes columns which correspond to directory information "directory", a name of the file "name" (e.g., such as directories), a size of (e.g., amount of data in) the file "length", the location of the beginning of the first data extent included in the file "first start block", the location of the beginning of the last data extent included in the file "last start block", the number of fragments included in the file "fragments", a current status of the file "status", and a number of the fragments which have already been read (e.g., copied to the cache) "read fragments". Again, more or less information corresponding to the various files stored on a magnetic tape may be displayed in the file list 1600 depending on the desired approach.

It should be noted that the information displayed in the different columns of the file list 1600 may be represented in any desired units, according to any code, etc. For example, the size of (e.g., amount of data in) the file length may be represented as bits, bytes, kilobytes (KB), megabytes (MB), gigabytes (GB), terabytes (TB), etc. According to another example, the column corresponding to the current status of each of the files status may display a word which is understood to correspond to a more detailed status of the file. In other words, the column corresponding to the current status of each of the files status may implement a code. According to an illustrative approach, the column corresponding to the current status of each of the files status may display "Direct" to represent that the corresponding file is non-fragmented, "Indirect" to represent that the corresponding file is fragmented and that data associated therewith has yet to be acquired, "Accumulating" to represent that data of the corresponding file is currently being read, "Ready to Write" to represent that the corresponding file is ready to be sent to the second magnetic tape, "Skip" to represent that the corresponding file is to be skipped (e.g., as described above), "Comp" to represent that the corresponding file has been successfully transferred to the cache and/or the second magnetic tape, etc.

According to an in-use example, which is in no way intended to limit the invention, upon reading data from the magnetic tape which corresponds to a new (e.g., unread) fragmented file, an entry may be made in the file list 1600 which represents the fragmented file. Moreover, information corresponding to the fragmented file may be entered into of the various columns. For instance, the directory identifier, name, length, first start block, last start block, status, and number of fragments read may be included in the new entry. As described above, for each of the files having fragments (e.g., "fragmented files"), the code in the status column is set to "Indirect" initially, and the number of fragments which have already been read is initialized to zero in the read fragments column. However, once the first fragment of the fragmented file is read, the code in the status column is changed to "Accumulating", thereby indicating that at least one fragment of the fragmented file has already been read and sent to cache. Moreover, as fragments of the fragmented file are read, they are sent to the cache where they are accumulated.

Once all the fragments corresponding to a given fragmented file have been accumulated in the cache, the status indicator of the current status of the file status may be changed to "Ready to Write", indicating that the fragmented file is available to be sent to the second tape drive and written on the second magnetic tape as mentioned above. It is preferred that the fragments corresponding to a same fragmented file which have been accumulated in cache are sent to the second tape drive to be written to the second magnetic tape during periods of low system throughput, when the second tape drive is inactive (e.g., has no pending operations), etc. Thus, the process of transferring the fragmented file to the second magnetic tape reduces the amount of processing strain imposed on the system, thereby improving efficiency while also ensuring that files are successfully written on the second magnetic tape in a non-fragmented fashion.

Moreover, after the fragmented file has been written on the second magnetic tape, the fragments of the file are preferably deleted from the cache, thereby freeing up valuable space in the cache. The current status of the file status is also changed to "Comp", thereby indicating that the fragmented file has been copied (e.g., transferred) to the second magnetic tape, e.g., as will be described in further detail below.

Looking to FIG. 16B, the directory information "directory", name of the file "name" (e.g., such as directories), size of (e.g., amount of data in) the file "length", and the location of the beginning of the last data extent included in the file "last start block" may also be stored in another file list 1650. The file information shown in file list 1650 may also be desirable during the process of transferring the data to the second magnetic tape as it effectively represents the end of each of the fragmented files on the first magnetic tape. In other words, the file list 1650 may be used to determine where the end of each fragmented file is.

According to some approaches, file list 1650 may be used to alter the contents of the designated portion of the cache in low capacity situations. For instance, the size of the designated portion of the cache may be limited by a user (e.g., $C_{User}$), and therefore low capacity situations in which fragments cannot be saved to the cache in view of a storage shortage may arise. According to an example which is in no way intended to limit the invention, the amount of available storage remaining in the designated portion of the cache may be smaller than the size of a fragment corresponding to File A, and received from the first tape drive. Accordingly, file list 1650 may be used to determine a fragment having a "last start block". As alluded to above, file list 1650 may order the entries (files) therein based on a fragment corresponding to each entry having the last start block. Accordingly, the last (e.g., bottom) entry in file list 1650 may have a last start block which is farthest from the beginning of the first magnetic tape.

Upon determining the last entry in the file list 1650, the current status corresponding to the file (File B) associated with the last entry is preferably set as "Skip" (e.g., as described above) if the last start block of File B is greater than that of File A. Ensuring that the last start block of File B is greater than that of File A may desirably avoid skipping over a substantial number of other files. According to the present example, the current status corresponding to File B would be set as "Skip". Thereafter, all fragments corresponding to File B currently accumulated in the designated portion of the cache may be deleted, thereby making room to store fragment of File A received above. Furthermore, the fragment corresponding to File A may be successfully stored in the designated portion of the cache without overflowing into a remainder of the cache, thereby ensuring data security, improved efficiency of the system, decreased data transfer rates, etc. Moreover, the fragments corresponding to File B which were deleted from the cache may be resent to the cache at a later point in time as a part of performing a second pass of the first magnetic tape to read the files which were skipped over on a first pass, e.g., as described in the various approaches included herein. On the contrary, if the last start block of File A is greater than File B, the current status corresponding to File A is set as "Skip".

According to other approaches, if somehow a fragment is read from the first magnetic tape which corresponds to a fragmented or non-fragmented file which has already been copied on the second magnetic tape, the fragment is preferably skipped over, thereby preventing any unnecessary consumption of processing power, storage capacity in the cache and/or the second magnetic tape, etc. For example, file list 1600 preferably sorts the files included therein by the first block number corresponding to the first fragment of each file, while file list 1650 preferably sorts the files included therein by the first block number corresponding to the last fragment of each file. Thus, assuming that FileX listed in file list 1600 is compared to FileZ in file list 1650, and the first start block of FileX is greater than the last start block of FileZ, then it may be concluded that all data of FileZ has already been saved in cache and/or on the second magnetic tape when FileX is read from the first magnetic tape. Accordingly, the current status of the file status corresponding to FileZ may also be changed to "Comp". However, if this determination is made while calculating the combined size of the fragments included in all of the fragmented files on the first magnetic tape, the size of FileZ may be removed from the running total.

It should also be noted that although various ones of the approaches described herein distinguish between fragmented and non-fragmented files based on whether the file has two or more fragments that are not stored sequentially on the magnetic tape, in other approaches the distinguishing factor between fragmented and non-fragmented files may be based on whether the file has a number of fragments which exceeds a threshold. For instance, in some approaches a file may be considered a fragmented file in response to the file having five or more fragments which are not sequentially (e.g., contiguously) stored on the magnetic tape relative to each other. This information may be available in an LTFS index, e.g., as would be appreciated by one skilled in the art after reading the present description.

Referring back to method 1400 of FIG. 14A, once the fragments of a fragmented file have been marked as "ready-to-write", operation 1426 includes sending one or more instructions to send a copy of each of the fragments corresponding to the fragmented file from the cache to the second tape drive. In other words, operation 1426 includes instructing the cache to send a copy of each fragment marked as "ready-to-write" to the second tape drive such that the corresponding file may be written to the second magnetic tape in a sequential and non-fragmented manner. In general, this process of sending a fragmented file in response to a determination that all of the fragments corresponding to the fragmented file have been accumulated in the cache may be considered an indirect copying process, e.g., in comparison to "directly" copying a non-fragmented file as described above.

Method 1400 further includes receiving an indication that each of the fragments corresponding to the given fragmented file have been stored on (e.g., written on) the second magnetic tape. See operation 1428. Moreover, operation 1430 includes sending one or more instructions to delete the fragments corresponding to the given fragmented file from the designated portion of the cache in response to receiving the indication in operation 1428. As mentioned above, cache is a valuable memory resource. Thus, once data which is taking up space on the cache has been successfully copied to the second magnetic tape, it is preferred that the data is deleted from the cache, thereby increasing memory usage efficiency, reducing memory consumption, increasing cache throughput, etc.

With continued reference to FIG. 14A, the flowchart proceeds from operation 1430 to decision 1432, which determines whether all fragmented files from the first magnetic tape have been copied to the second magnetic tape. As shown, method 1400 may return to operation 1422 in response to determining that all fragmented files from the first magnetic tape have not yet been copied to the second magnetic tape. Accordingly, operations 1422, 1426, 1428 and 1430 may be performed again upon receiving another indication that all of the fragments corresponding to another fragmented file have been accumulated in the cache, e.g., according to any of the approaches described above.

However, returning to decision 1432, the flowchart of FIG. 14A proceeds to operation 1434 in response to determining that all fragmented files from the first magnetic tape have been copied to the second magnetic tape, whereby method 1400 may end. However, it should be noted that although method 1400 may end upon reaching operation 1434, any one or more of the processes included in method 1400 may be repeated in order to copy data between two different magnetic tapes. In other words, any one or more of the processes included in method 1400 may be repeated for additional magnetic tapes as desired.

Figure 14D:
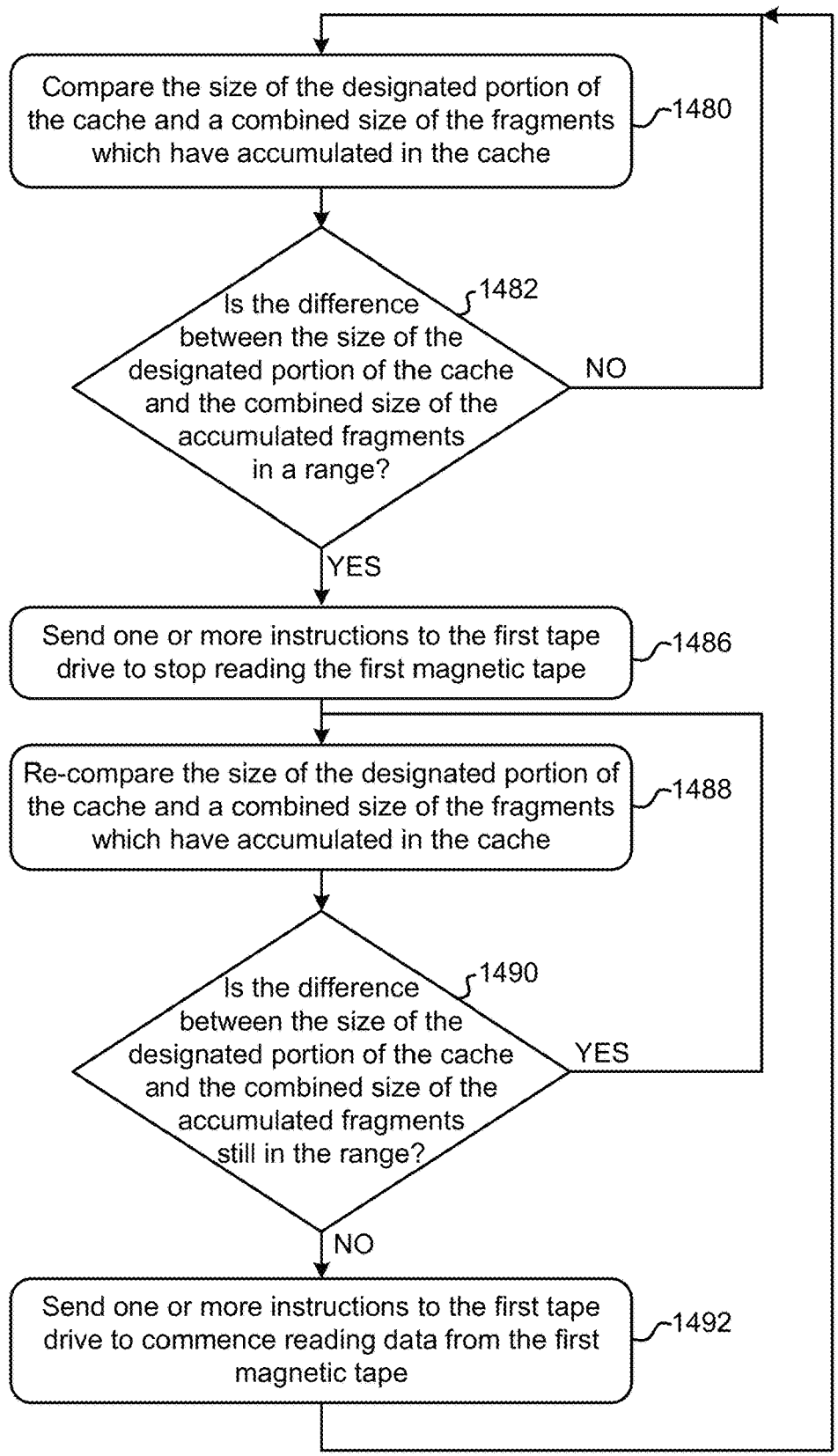
FIG. 14D is a flowchart of sub-processes in accordance with one embodiment.

Although not shown in FIG. 14A, method 1400 may also include performing one or more processes to prevent overfilling of the designated (e.g., reserved) area of the cache. These one or more processes may be desirable as overfilling the designated area of the cache may cause other data stored in the cache to be overwritten, a degradation of cache performance (e.g., throttling), certain cache functions to become unavailable, etc. The processes performed to prevent overfilling the designated (e.g., reserved) area of the cache may vary depending on the approach. Moreover, these processes may be performed in the background such that they do not affect the performance of the various other processes included in method 1400 under normal operating conditions, e.g., as will soon become apparent. Looking to FIG. 14D, exemplary sub-processes for prevent overfilling of the designated (e.g., reserved) area of the cache are illustrated in accordance with one approach, one or more of which may be performed in the background of method 1400. However, it should be noted that the sub-processes of FIG. 14D are illustrated in accordance with one approach which is in no way intended to limit the invention.

As shown, sub-operation 1480 includes comparing the size of the designated portion of the cache and a combined size of the fragments which have accumulated in the cache. The size of the designated portion of the cache may be stored in memory after performing the calculation in operation 1412 of FIG. 14A above. Accordingly, the sub-processes included in FIG. 14D may be performed after the calculation in operation 1412 of FIG. 14A has been made. However, in other approaches the size of the designated portion of the cache may be determined separately from operation 1412, and therefore sub-operation 1480 may be performed irrespective of whether operation 1412 has already been performed.

Moreover, the combined size of the fragments which have accumulated in the cache may be determined by referencing a table which may track the number of fragments currently in the cache, the size of (e.g., amount of data in) each of the fragments currently in the cache, which fragmented file each of the fragments currently in the cache correspond to, etc. Thus, by referencing a table which has stored this information pertaining to the fragments, the combined size of the fragments which have accumulated in the cache may be determined.

Furthermore, decision 1482 includes determining whether a difference between the size of the designated portion of the cache and the combined size of the accumulated fragments is in a range. In other words, decision 1482 determines whether the designated portion of the cache has been filled past a certain point such that the difference between the size of the designated portion of the cache and the combined size of the accumulated fragments is in the range. Depending on the approach, the range may be predefined, e.g., by a user, an administrator, a default setting, etc.; calculated using performance data; updated over time; etc. Moreover, it should be noted that "in the range" is in no way intended to limit the invention. Rather than determining whether a value is in the range, equivalent determinations may be made, e.g., as to whether a value is above a threshold, whether a value is outside a predetermined range, whether an absolute value is above a threshold, whether a value is below a threshold, etc., depending on the desired approach.

As shown, the flowchart in FIG. 14D returns to sub-operation 1480 in response to determining that the difference between the size of the designated portion of the cache and the combined size of the accumulated fragments is not in the range. In other words, the flowchart in FIG. 14D returns to sub-operation 1480 in response to determining that the designated portion of the cache is not filled an undesirable amount. Accordingly, sub-operation 1480 and decision 1482 may be repeated in a repetitive fashion, at least until it is determined that the difference between the size of the designated portion of the cache and the combined size of the accumulated fragments is in the range, whereby the flowchart proceeds to sub-operation 1486. There, sub-operation 1486 includes sending one or more instructions to the first tape drive in which the first magnetic tape is loaded to stop reading the first magnetic tape. It is preferred that the first tape drive actually stops reading data from the first magnetic tape at a convenient location. For instance, the first tape drive may actually stop reading data upon reaching the boundary between two files, upon completing a current read operation, etc. This avoids fragments from being partially stored in the cache. However, in other approaches the first tape drive may immediately stop reading data from the first magnetic tape upon being instructed to do so.

By halting the first tape drive from reading the first magnetic tape, sub-operation 1486 allows for data to be transferred from the cache to the second magnetic tape without receiving any additional data from the first magnetic tape. Thus, although cache may not be receiving data from the first tape drive, the cache is preferably still defragmenting files and sending a copy of each of the fragments corresponding to the defragmented file to the second tape drive. In other words, sub-operation 1486 allows for the cache to be emptied to a desired level whereby normal operation may be resumed (see sub-operation 1492 below).

In preferred approaches, the fragments included in the cache may be used to defragment a number of files which, after being sent to the second tape drive and subsequently deleted from cache, is able to adjust the difference between the size of the designated portion of the cache and the combined size of the accumulated fragments such that it is no longer in the range. As a result, the cache may be returned to normal operation while also preventing any fragmented files from being copied to the second magnetic tape. However, in some approaches portions of files (fragmented files) may be sent to the second magnetic tape in order to clear enough space in the cache to return to normal operation. For example, the fragments included in the cache may not be able to defragment a sufficient number of files.

With continued reference to FIG. 14D, the flowchart proceeds to sub-operation 1488 which includes re-comparing the size of the designated portion of the cache and a combined size of the fragments which have accumulated in the cache. As mentioned above, the sub-processes included in FIG. 14D may be performed in the background, thereby not effecting most of the processes included in method 1400. Thus, although sub-operation 1486 effectively stops the first tape drive from reading the first magnetic tape, data may still be transferred from the cache to the second magnetic tape. In other words, operations 1422, 1426, 1428 and 1430 in FIG. 14A may be repeated while the first tape drive remains stopped. By re-comparing the size of the designated portion of the cache and a combined size of the fragments which have accumulated in the cache, sub-operation 1488 is effectively quantifying how much of the cache has been emptied.

Proceeding to decision 1490, a determination is made as to whether the difference between the size of the designated portion of the cache and the combined size of the accumulated fragments is still in the range. The flowchart returns to sub-operation 1488 in response to determining that the difference is still in the range, whereby the size of the designated portion of the cache and a combined size of the fragments which have accumulated in the cache may be re-compared. However, each re-comparison is preferably performed after an amount of time has passed since the last comparison (or re-comparison) was performed, e.g., such that the cache may be given time to be cleared further. However, depending on the desired approach, re-performing sub-operation 1488 may be delayed until an input is received from a user, a predetermined condition is met, an indication is received from the cache, etc.

Sub-processes 1490 and 1488 may be repeated until it is determined that the difference between the size of the designated portion of the cache and the combined size of the accumulated fragments is no longer in the range. Accordingly, the flowchart proceeds to sub-operation 1492 in response to determining that the difference between the size of the designated portion of the cache and the combined size of the accumulated fragments is no longer in the range. There, sub-operation 1492 includes sending one or more instructions to the first tape drive to commence reading data from the first magnetic tape. In other words, in response to determining that the cache is no longer filled passed a desired threshold, the first tape drive may be removed from a stopped state (e.g., see sub-operation 1486 above) and returned to normal operation whereby the first tape drive may commence reading data from the first magnetic tape and processing the data stored thereon according to the various processes included in method 1400.

As previously mentioned, any one or more of the processes included in method 1400 may be performed by a computer (e.g., a controller) coupled to one or more storage components of a storage system. Accordingly, referring momentarily back to the storage system 1300 of FIG. 13, various ones of the processes included in method 1400 may be performed by the controller 1310 coupled to the first tape drive 1306, whereby the controller 1310 may send one or more instructions to the first tape drive 1306, the second tape drive 1312, the cache 1322, and/or the respective controllers coupled thereto, e.g., using an electrical connection extending therebetween and/or the network 1318. In another approach, various ones of the processes included in method 1400 may be performed by the controller 1316 coupled to the second tape drive 1312, whereby the controller 1316 may send one or more instructions to the second tape drive 1312, the first tape drive 1306, the cache 1322, and/or the respective controllers coupled thereto, e.g., using an electrical connection extending therebetween and/or the network 1318. In still another approach, various ones of the processes included in method 1400 may be performed by the controller 1324 which is directly coupled to the cache 1322, whereby the controller 1324 may send one or more instructions to the cache 1322, the first tape drive 1306, the second tape drive 1312, and/or the respective controllers coupled thereto, e.g., using an electrical connection extending therebetween and/or the network 1318. As described above, each of the controllers 1310, 1316, 1324 may be in communication with the various other components included in the storage system 1300 due to their respective connections to the network 1318.

It follows that the various approaches included herein are able to copy fragmented and non-fragmented files between sequential storage mediums in an efficient manner without experiencing the delays and other inefficiencies which plague conventional products. For instance, by copying each portion of data between sequential storage mediums using a process which depends on the type of file the particular portion of data corresponds to, efficiency is significantly increased, e.g., as described in the various approaches included herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method for copying fragmented files and non-fragmented files from a first sequential storage medium to a second sequential storage medium, the method comprising:
   sending one or more instructions to calculate a combined size of fragments included in the fragmented files;
   sending one or more instructions to designate a portion of cache which corresponds to at least the combined size of the fragments;
   sending one or more instructions to send a copy of each non-fragmented file from a first drive directly to a second drive in which the second sequential storage medium is loaded;
   sending one or more instructions to use the designated portion of the cache to accumulate the fragments included in the fragmented files; and
   sending one or more instructions to send a copy of each of the fragments corresponding to a given fragmented file from the cache to the second drive in response to a determination that all of the fragments corresponding to the given fragmented file have been accumulated in the cache.

2. The computer-implemented method as recited in claim 1, wherein each of the operations is performed by a computer in communication with the cache and directly coupled to the first drive in which the first sequential storage medium is loaded.

3. The computer-implemented method as recited in claim 1, wherein each of the operations is performed by a computer directly coupled to the cache and in communication with the first drive in which the first sequential storage medium is loaded.

4. The computer-implemented method as recited in claim 1, wherein a total number of fragments included in each of the fragmented files is stored in a linear tape file system (LTFS) index.

5. The computer-implemented method as recited in claim 1, wherein determining that all of the fragments corresponding to the given fragmented file have been accumulated in the cache includes:
   comparing each of a number of counters with a total number of fragments in a respective one of the fragmented files,
   wherein each of the counters corresponds to a number of the fragments of a respective one of the fragmented files which have been accumulated in the designated portion of the cache,
   wherein the total number of fragments in each of the fragmented files is stored in a LTFS index,
   wherein the determination that all of the fragments corresponding to the given fragmented file have been accumulated in the cache is made in response to determining that the counter corresponding to the given fragmented file is equal to the total number of fragments in the given fragmented file.

6. The computer-implemented method as recited in claim 1, comprising:
   receiving an indication that each of the fragments corresponding to the given fragmented file have been stored on the second sequential storage medium; and
   sending one or more instructions to delete the fragments corresponding to the given fragmented file from the designated portion of the cache.

7. The computer-implemented method as recited in claim 1, comprising:
   determining whether a difference between a size of the designated portion of the cache and a combined size of the accumulated fragments is in a predefined range; and
   sending one or more instructions to the first drive in which the first sequential storage medium is loaded to stop reading the first sequential storage medium in response to determining that the difference between the size of the designated portion of the cache and the combined size of the accumulated fragments is in the range.

8. The computer-implemented method as recited in claim 1, wherein calculating the combined size of the fragments included in the fragmented files is based on: a number of fragments in the fragmented files, and a position of the first sequential storage medium.

9. The computer-implemented method as recited in claim 1, wherein calculating the combined size of the fragments included in the fragmented files includes:
   examining entries in a linear tape file system (LTFS) index, wherein each of the entries corresponds to a fragment on the first sequential storage medium, wherein each of the entries denotes a start position and a size of the corresponding fragment;
   determining whether each entry in the LTFS index corresponds to a first fragment of a fragmented file; and
   in response to determining that an entry in the LTFS index corresponds to a first fragment of a given fragmented file, adding a full size of the given fragmented file to the combined size.

10. The computer-implemented method as recited in claim 1, wherein calculating the combined size of the fragments included in the fragmented files includes:
    examining entries in a linear tape file system (LTFS) index, wherein each of the entries corresponds to a fragment on the first sequential storage medium, wherein each of the entries denotes a start position and a size of the corresponding fragment;
    determining whether each entry in the LTFS index corresponds to a fragment of a fragmented file; and
    in response to determining that an entry in the LTFS index corresponds to a given fragment of a fragmented file, adding the size of the given fragment to the combined size.

11. A computer program product for copying fragmented files and non-fragmented files from a first sequential storage medium to a second sequential storage medium, the computer program product comprising a computer readable storage medium having program instructions embodied therewith, wherein the computer readable storage medium is not a transitory signal per se, the program instructions readable and/or executable by a processor to cause the processor to perform a method comprising:
    calculating, by the processor, a combined size of fragments included in the fragmented files;
    sending, by the processor, one or more instructions to designate a portion of cache which corresponds to at least the combined size of the fragments;
    sending, by the processor, a copy of each non-fragmented file directly to a second drive in which the second sequential storage medium is loaded;
    sending, by the processor, one or more instructions to use the designated portion of the cache to accumulate the fragments included in the fragmented files; and
    sending, by the processor, one or more instructions to send a copy of each of the fragments corresponding to a given fragmented file from the cache to the second drive in response to a determination that all of the fragments corresponding to the given fragmented file have been accumulated in the cache.

12. The computer program product as recited in claim 11, wherein a total number of fragments included in each of the fragmented files is stored in a linear tape file system (LTFS) index.

13. The computer program product as recited in claim 11, wherein determining that all of the fragments corresponding to the given fragmented file have been accumulated in the cache includes:
comparing each of a number of counters with a total number of fragments in a respective one of the fragmented files,
wherein each of the counters corresponds to a number of the fragments of a respective one of the fragmented files which have been accumulated in the designated portion of the cache,
wherein the total number of fragments in each of the fragmented files is stored in a LTFS index,
wherein the determination that all of the fragments corresponding to the given fragmented file have been accumulated in the cache is made in response to determining that the counter corresponding to the given fragmented file is equal to the total number of fragments in the given fragmented file.

14. The computer program product as recited in claim 11, the program instructions readable and/or executable by the processor to cause the processor to perform the method comprising:
receiving, by the processor, an indication that each of the fragments corresponding to the given fragmented file have been stored on the second sequential storage medium; and
sending, by the processor, one or more instructions to delete the fragments corresponding to the given fragmented file from the designated portion of the cache.

15. The computer program product as recited in claim 11, the program instructions readable and/or executable by the processor to cause the processor to perform the method comprising:
determining, by the processor, whether a difference between a size of the designated portion of the cache and a combined size of the accumulated fragments is in a predefined range; and
instructing, by the processor, a first drive in which the first sequential storage medium is loaded to stop reading the first sequential storage medium in response to determining that the difference between the size of the designated portion of the cache and the combined size of the accumulated fragments is in the range.

16. The computer program product as recited in claim 11, wherein calculating the combined size of the fragments included in the fragmented files includes:
examining entries in a linear tape file system (LTFS) index, wherein each of the entries corresponds to a fragment on the first sequential storage medium, wherein each of the entries denotes a start position and a size of the corresponding fragment;
determining whether each entry in the LTFS index corresponds to a first fragment of a fragmented file; and
in response to determining that an entry in the LTFS index corresponds to a first fragment of a given fragmented file, adding a full size of the given fragmented file to the combined size.

17. The computer program product as recited in claim 11, wherein calculating the combined size of the fragments included in the fragmented files includes:
examining entries in a linear tape file system (LTFS) index, wherein each of the entries corresponds to a fragment on the first sequential storage medium, wherein each of the entries denotes a start position and a size of the corresponding fragment;
determining whether each entry in the LTFS index corresponds to a fragment of a fragmented file; and
in response to determining that an entry in the LTFS index corresponds to a given fragment of a fragmented file, adding the size of the given fragment to the combined size.

18. A computer program product for copying fragmented files and non-fragmented files from a first sequential storage medium to a second sequential storage medium, the computer program product comprising a computer readable storage medium having program instructions embodied therewith, wherein the computer readable storage medium is not a transitory signal per se, the program instructions readable and/or executable by a processor to cause the processor to perform a method comprising:
sending, by the processor, one or more instructions to calculate a combined size of fragments included in the fragmented files;
designating, by the processor, a portion of cache which corresponds to at least the combined size of the fragments;
sending, by the processor, one or more instructions to send a copy of each non-fragmented file from a first drive directly to a second drive in which the second sequential storage medium is loaded;
using, by the processor, the designated portion of the cache to accumulate copies of the fragments included in the fragmented files; and
sending, by the processor, the copy of each of the fragments corresponding to a given fragmented file from the cache to the second drive in response to a determination that all of the fragments corresponding to the given fragmented file have been accumulated in the cache.

19. The computer program product as recited in claim 18, wherein a total number of fragments included in each of the fragmented files is stored in a linear tape file system (LTFS) index.

20. The computer program product as recited in claim 18, wherein determining that all of the fragments corresponding to the given fragmented file have been accumulated in the cache includes:
comparing each of a number of counters with a total number of fragments in a respective one of the fragmented files,
wherein each of the counters corresponds to a number of the fragments of a respective one of the fragmented files which have been accumulated in the designated portion of the cache,
wherein the total number of fragments in each of the fragmented files is stored in a LTFS index,
wherein the determination that all of the fragments corresponding to the given fragmented file have been accumulated in the cache is made in response to determining that the counter corresponding to the given fragmented file is equal to the total number of fragments in the given fragmented file.

21. The computer program product as recited in claim 18, the program instructions readable and/or executable by the processor to cause the processor to perform the method comprising:

receiving, by the processor, an indication that each of the fragments corresponding to the given fragmented file have been stored on the second sequential storage medium; and deleting, by the processor, the fragments corresponding to the given fragmented file from the designated portion of the cache.

22. The computer program product as recited in claim 18, the program instructions readable and/or executable by the processor to cause the processor to perform the method comprising:

determining, by the processor, whether a difference between a size of the designated portion of the cache and a combined size of the accumulated fragments is in a predefined range; and sending, by the processor, one or more instructions to the first drive in which the first sequential storage medium is loaded to stop reading the first sequential storage medium in response to determining that the difference between the size of the designated portion of the cache and the combined size of the accumulated fragments is in the range.

23. The computer program product as recited in claim 18, wherein calculating the combined size of the fragments included in the fragmented files includes:

examining entries in a linear tape file system (LTFS) index, wherein each of the entries corresponds to a fragment on the first sequential storage medium, wherein each of the entries denotes a start position and a size of the corresponding fragment;

determining whether each entry in the LTFS index corresponds to a first fragment of a fragmented file; and in response to determining that an entry in the LTFS index corresponds to a first fragment of a given fragmented file, adding a full size of the given fragmented file to the combined size.

24. The computer program product as recited in claim 18, wherein calculating the combined size of the fragments included in the fragmented files includes:

examining entries in a linear tape file system (LTFS) index, wherein each of the entries corresponds to a fragment on the first sequential storage medium, wherein each of the entries denotes a start position and a size of the corresponding fragment;

determining whether each entry in the LTFS index corresponds to a fragment of a fragmented file; and in response to determining that an entry in the LTFS index corresponds to a given fragment of a fragmented file, adding the size of the given fragment to the combined size.

25. A system, comprising:

a first tape drive, comprising:
    a magnetic head;
    a drive mechanism for passing a sequential storage medium over the magnetic head; and
    a take-up reel;

a processor; and logic integrated with the processor, executable by the processor, or integrated with and executable by the processor, the logic being configured to:

calculate, by the processor, a combined size of fragments included in fragmented files;

send, by the processor, one or more instructions to designate a portion of cache which corresponds to at least the combined size of the fragments;

send, by the processor, a copy of each non-fragmented file directly to a second drive in which a second sequential storage medium is loaded;

send, by the processor, one or more instructions to use the designated portion of the cache to accumulate the fragments included in the fragmented files; and send, by the processor, one or more instructions to send a copy of each of the fragments corresponding to a given fragmented file from the cache to the second drive in response to a determination that all of the fragments corresponding to the given fragmented file have been accumulated in the cache.

\* \* \* \* \*